United States Patent
Lee et al.

(10) Patent No.: US 11,444,481 B2
(45) Date of Patent: Sep. 13, 2022

(54) WIRELESS POWER TRANSMITTER, ELECTRONIC DEVICE AND CONTROLLING METHOD THEREOF

(71) Applicant: SAMSUNG ELECTRONICS CO., LTD., Suwon-si (KR)

(72) Inventors: Kyung-Woo Lee, Seoul (KR); Sang-Wook Kwon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 17/022,471

(22) Filed: Sep. 16, 2020

(65) Prior Publication Data

US 2020/0412158 A1 Dec. 31, 2020

Related U.S. Application Data

(63) Continuation of application No. 15/852,110, filed on Dec. 22, 2017, now Pat. No. 10,811,896.

(30) Foreign Application Priority Data

Dec. 23, 2016 (KR) ........................ 10-2016-0178487

(51) Int. Cl.
*H02J 7/04* (2006.01)
*H02J 7/02* (2016.01)
(Continued)

(52) U.S. Cl.
CPC ............... *H02J 7/04* (2013.01); *H02J 7/025* (2013.01); *H02J 50/20* (2016.02); *H02J 50/90* (2016.02);
(Continued)

(58) Field of Classification Search
CPC ...................................................... H02J 7/04
(Continued)

(56) References Cited

U.S. PATENT DOCUMENTS 9,966,765 B1 * 5/2018 Leabman ................ H02J 50/23
2004/0142733 A1 * 7/2004 Parise ................... B01F 5/0614
455/572
(Continued)

FOREIGN PATENT DOCUMENTS

KR 1020140098239 A 8/2014
KR 1020140123222 A 10/2014

OTHER PUBLICATIONS

Written Opinion (PCT/ISA/237) issued by the International Searching Authority in corresponding International Application No. PCT/KR2017/015337, dated Mar. 30, 2018.
(Continued)

*Primary Examiner* — Jerry D Robbins
(74) *Attorney, Agent, or Firm* — Sughrue Mion, PLLC

(57) ABSTRACT

A wireless power transmitter includes an antenna and a processor configured to control the antenna to respectively transmit detection powers in a plurality of directions, the detection powers including a first detection power and a second detection power, the first detection power including a first direction information and identification information of the wireless power transmitter, the first detection power being transmitted in a first direction, the second detection power including a second direction information and the identification information of the wireless power transmitter, the second detection power being transmitted in a second direction different from the first direction; control to receive a communication signal including the first direction information and the identification information of the wireless power transmitter from an electronic device which received the first detection power; and based on receiving the communication signal, control the antenna to transmit power for charging in the first direction.

18 Claims, 21 Drawing Sheets

(51) Int. Cl.
*H04B 1/3827* (2015.01)
*H02J 50/20* (2016.01)
*H02J 50/90* (2016.01)
*H01Q 21/06* (2006.01)
*H04B 5/00* (2006.01)
*H02J 50/40* (2016.01)

(52) U.S. Cl.
CPC ......... *H04B 1/3838* (2013.01); *H01Q 21/065* (2013.01); *H02J 50/40* (2016.02); *H04B 5/0037* (2013.01)

(58) Field of Classification Search
USPC ....................................................... 320/108
See application file for complete search history.

(56) References Cited

U.S. PATENT DOCUMENTS

| | | |
|---|---|---|
| 2007/0178945 A1 | 8/2007 | Cook et al. |
| 2008/0014897 A1* | 1/2008 | Cook ................... H04B 5/0037 455/343.1 |
| 2010/0033021 A1 | 2/2010 | Bennett |
| 2010/0150038 A1 | 6/2010 | Nanda et al. |
| 2010/0315045 A1 | 12/2010 | Zeine |
| 2013/0137455 A1 | 5/2013 | Xia et al. |
| 2013/0141037 A1 | 6/2013 | Jenwatanavet et al. |
| 2013/0288595 A1* | 10/2013 | Lee ......................... H01F 38/14 455/39 |
| 2015/0008736 A1* | 1/2015 | Uchida ................... H02J 50/40 307/18 |
| 2016/0099610 A1 | 4/2016 | Leabman et al. |
| 2016/0099611 A1 | 4/2016 | Leabman et al. |
| 2016/0099755 A1 | 4/2016 | Leabman et al. |
| 2016/0100124 A1 | 4/2016 | Leabman et al. |
| 2017/0018954 A1* | 1/2017 | Lee ......................... H02J 50/12 |
| 2017/0353338 A1* | 12/2017 | Amadjikpe ............ H01Q 1/243 |

OTHER PUBLICATIONS

International Search Report (PCT/ISA/210), issued by International Searching Authority in corresponding International Application No. PCT/KR2017/015337, dated Mar. 30, 2018.

Communication dated Oct. 23, 2019, from the European Patent Office in counterpart European Application No. 17882607.9.

* cited by examiner

WIRELESS POWER TRANSMITTER, ELECTRONIC DEVICE AND CONTROLLING METHOD THEREOF

CROSS-REFERENCE TO RELATED APPLICATIONS

This is a continuation of U.S. application Ser. No. 15/852,110 filed Dec. 22, 2017, which claims priority from Korean Patent Application No. 10-2016-0178487, filed in the Korean Intellectual Property Office on Dec. 23, 2016. The entire content of each of the above-identified applications is incorporated by reference herein in its entirety.

BACKGROUND

The present disclosure relates to a wireless power transmitter, an electronic device, and a control method thereof, and, more particularly, relates to a wireless power transmitter for wirelessly transmitting power to an electronic device, an electronic device for receiving power from a wireless power transmitter, and a control method thereof.

Portable digital communication devices have come essential to many people in modern times. Customers desire to receive various high-quality services anywhere and around the clock. In addition, recently various sensors, home appliances, communication devices or the like existing in our lives have been connected over a network through Internet of Things (IoT). A wireless power transmission system is required to smoothly operate the various sensors.

Wireless power transmission may include a magnetic induction scheme, a magnetic resonance scheme, and an electromagnetic wave scheme, and the electromagnetic wave scheme may be more useful than other schemes for long-distance power transmission such as long-distance power transmission over a distance of several meters.

The electromagnetic wave scheme is mainly used for the long-distance power transmission, and can most efficiently transfer power by recognizing the accurate location of a power receiver located at a long distance.

A related art electromagnetic wave scheme forms radio frequency (RF) waves in a plurality of directions in order to determine the location of a charging target, for example, an electronic device, receives power related information from the electronic device, and determines the location of the electronic device using the received information. However, it takes a long time to form RF waves in a plurality of directions and to receive power related information. In this instance, it is unsure if the electronic device is fixed at one location. Particularly, high power cannot be transmitted before a charging target is detected, since the high power may be harmful to human bodies.

SUMMARY

Various embodiments of the present disclosure are provided to solve the above described problem or other problems, and may provide a wireless power transmitter for more promptly detecting an electronic device corresponding to a charging target, a control method of the wireless power transmitter, an electronic device for operating in response to the wireless power transmitter, and a control method of the electronic device.

A power transmitter according to various embodiments of the present disclosure may include: an antenna for transmitting a plurality of detection powers, each of which includes direction information, in a plurality of directions, respectively; a communication circuit for receiving a communication signal including first direction information included in a first detection power from an electronic device which receives the first detection power among the plurality of detection powers; and a processor for controlling to transmit power for charging based on the first direction information included in the communication signal.

A control method of a power transmitter according to various embodiments of the present disclosure may include: transmitting a plurality of detection powers, each of which includes direction information, in a plurality of directions; receiving a communication signal including first direction information included in a first detection power, from an electronic device that receives the first detection power among the plurality of detection powers; and transmitting power for charging based on the first direction information included in the communication signal.

An electronic device according to various embodiments of the present disclosure may include: an antenna for receiving power including direction information; a processor for extracting the direction information from the received power; and a communication circuit for transmitting a communication signal including the extracted direction information.

A control method of an electronic device according to various embodiments of the present disclosure may include: receiving power including direction information; extracting the direction information from the received power; and transmitting a communication signal including the extracted direction information.

According to various embodiments of the present disclosure, there are provided a wireless power transmitter for more promptly detecting an electronic device which is a charging target, a control method of the wireless power transmitter, an electronic device for operating in response to the wireless power transmitter, and a control method of the electronic device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
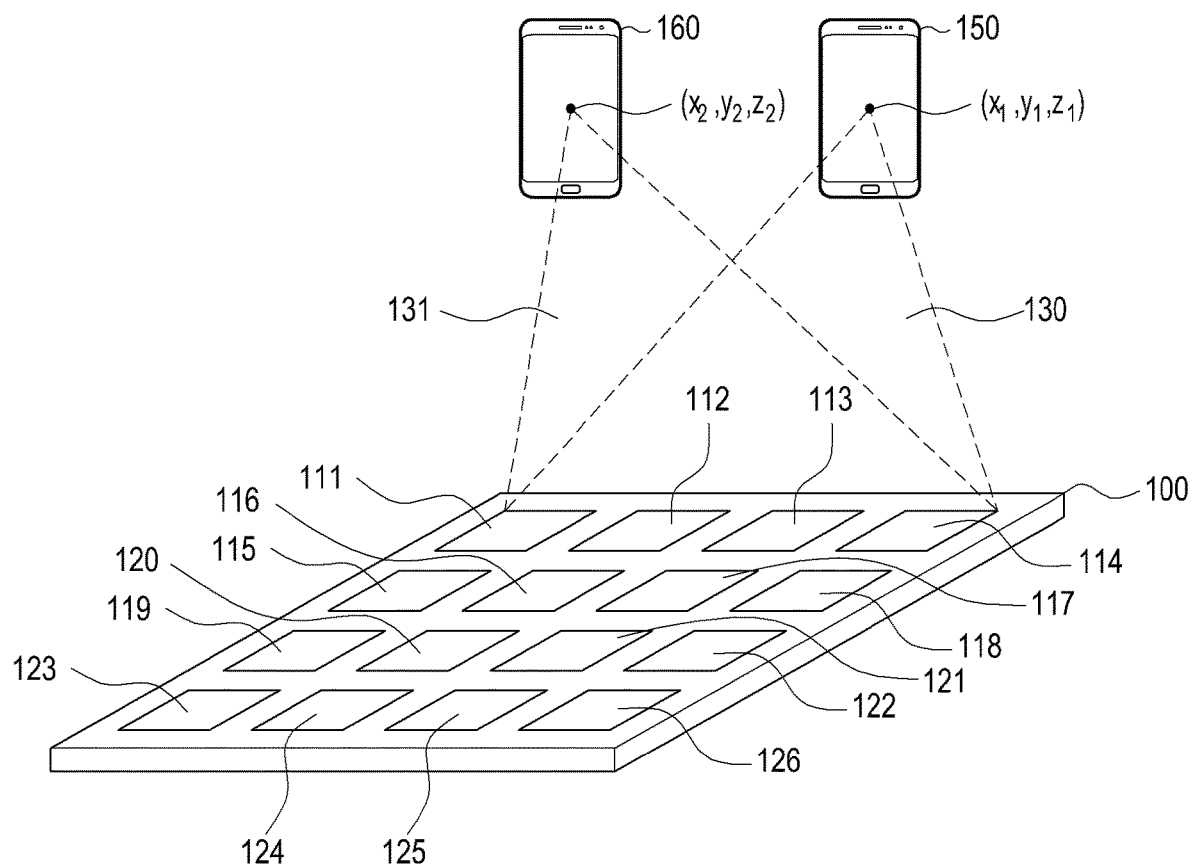
FIG. 1 is a conceptual diagram illustrating a wireless power transmission system according to various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, A wireless power transmitter or an electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a media box a game console, an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). According to various embodiments, a wireless power transmitter or an electronic device may be flexible, or may be a combination of two or more of the above described various devices. A wireless power transmitter or an electronic device according to various embodiments of the present disclosure may not be limited to the above described devices. In the present disclosure, the term "user" may indicate a person who uses an electronic device or a device (e.g., an artificial intelligence electronic device) that uses a wireless power transmitter or an electronic device.

FIG. 1 is a conceptual diagram illustrating a wireless power transmission system according to various embodiments of the present disclosure.

A wireless power transmitter 100 may wirelessly transmit power to at least one among electronic devices 150 and 160. In various embodiments of the present disclosure, the wireless power transmitter 100 may include one or more of patch antennas 111 to 126. Any antenna that is capable of generating an RF wave can be used as the patch antenna 111 to 126. At least one of the amplitude and the phase of an RF wave generated by the patch antenna 111 to 126 may be adjusted by the wireless power transmitter 100. For ease of description, an RF wave generated by each of the patch antennas 111 to 126 may be referred to as a sub-RF wave.

According to various embodiments of the present disclosure, the wireless power transmitter 100 may adjust at least one of the amplitude and the phase of each of the sub-RF waves generated by the patch antennas 111 to 126. The sub-RF waves may mutually interfere with one another. For example, the sub-RF waves may mutually create constructive interference at one point, and may mutually create destructive interference at another point. The wireless power transmitter 100 according to various embodiments of the present disclosure may adjust at least one of the amplitude and the phase of each of sub-RF waves generated by the patch antennas 111 to 126 such that the sub-RF waves mutually create constructive interference at a first point (x1,y1,z1).

For example, the wireless power transmitter 100 may determine that the electronic device 150 is disposed at the first point (x1,y1,z1). Here, the location of the electronic device 150 may be, for example, a point where a power reception antenna of the electronic device 150 is located. The architecture in which the wireless power transmitter 100 determines the location of the electronic device 150 will be described in detail later. To enable the electronic device 150 to wirelessly receive power with high transmission efficiency, sub-RF waves need to create constructive interference at the first point (x1,y1,z1). Accordingly, the wireless power transmitter 100 may control the patch antennas 111 to 126 such that the sub-RF waves mutually create constructive interference at the first point (x1,y1,z1). Here, controlling the patch antennas 111 to 126 may indicate controlling the magnitude of a signal input to the patch antennas 111 to 126 or controlling the phase (or delay) of a signal input to the patch antennas 111 to 126. Those skilled in the art may readily understand beamforming which is a technology for controlling RF waves to create constructive interference at a predetermined point. Additionally, those skilled in the art may readily understand that the type of beamforming used in the present disclosure is not limited. Various beamforming methods may be used, such as methods disclosed in U.S. Patent Application Publication No. 2016/0099611, U.S. Patent Application Publication No. 2016/0099755, U.S. Patent Application Publication No. 2016/0100124, and the like. The form of RF waves formed by beamforming may be referred to as pockets of energy.

Accordingly, an RF wave 130 including sub-RF waves may have the maximum amplitude at the first point (x1,y1,z1) and, accordingly, the electronic device 150 may receive wireless power with high efficiency. The wireless power transmitter 100 may detect that the electronic device 160 is disposed at a second point (x2,y2,z2). The wireless power transmitter 100 may control patch antennas 111 to 126 such that sub-RF waves create constructive interference at the second point (x2,y2,z2), in order to charge the electronic device 160. Accordingly, an RF wave 131 including sub-RF waves may have the maximum amplitude at the second point (x2,y2,z2) and, accordingly, the electronic device 160 may receive wireless power with high transmission efficiency.

More particularly, the electronic device 150 may be disposed relatively on the right side. In this instance, the wireless power transmitter 100 may apply a relatively higher delay to sub-RF waves formed from patch antennas (e.g., patch antennas 114, 118, 122, and 126) disposed relatively on the right side. That is, sub-RF waves may be generated from patch antennas (e.g., patch antennas 114, 118, 122, and 126) disposed relatively on the right side a predetermined period of time after sub-RF waves are formed, which are formed by patch antennas (e.g., patch antennas 111, 115, 119, and 123) disposed relatively on the left side. Accordingly, the sub-RF waves may simultaneously meet at a point relatively on the relatively right side. That is, the sub-RF waves may create constructive interference at the point relatively on the right side. When beamforming is performed at a relatively center point, the wireless power transmitter 100 may apply substantially the same delay to the left side patch antennas (e.g., patch antennas 111, 115, 119, and 123) and the right side patch antennas (e.g., patch antennas 114, 118, 122, and 126). Also, when beamforming is performed at a point relatively on the left side, the wireless power transmitter 100 may apply a higher delay to the left side patch antennas (e.g., patch antennas 111, 115, 119, and 123) than to the right side patch antennas (e.g., patch antennas 114, 118, 122, and 126). According to another embodiment, the wireless power transmitter 100 may oscillate the sub-RF waves by all the patch antennas 111 to 126 at substantially the same time, and may perform beamforming by adjusting a phase corresponding to the above described delay. That is, the wireless power transmitter 100 may determine the degree of phase shifting corresponding to each patch antenna (e.g., the degree of delay for each patch antenna) that corresponds to the direction of an RF wave. The wireless power transmitter 100 may change the beamforming direction by adjusting the degree of phase shifting of each input electric signal for each patch antenna.

The wireless power transmitter 100 may change a beamforming distance by adjusting the amplitude of an electric signal input for each patch antenna. For example, the wireless power transmitter 100 may fix the degree of phase shifting of each of the electric signals input for each patch antenna, that is, may fix a beamforming direction, and may increase or decrease the amplitude of an electric signal input for each patch antenna all together. When the amplitude of an electric signal input for each patch antenna is increased all together, a beam distance formed in the fixed beamforming direction may be increased. When the amplitude of an electric signal input for each patch antenna is decreased all together, a beam distance formed in the fixed beam forming direction may be decreased. That is, the wireless power transmitter 100 according to various embodiments of the present disclosure may control the distance of a formed RF wave by adjusting the amplitude of an electric signal input for each patch antenna.

As described above, the wireless power transmitter 100 may determine the location of the electronic device 150 and 160, and may enable sub-RF waves to create constructive interference at the determined location, thereby performing wireless charging or wireless power transmission with high transmission efficiency. Only after accurately recognizing the location of the electronic device 150 and 160, the wireless power transmitter 100 can perform wireless charging or wireless power transmission with high transmission efficiency.

Figure 2:
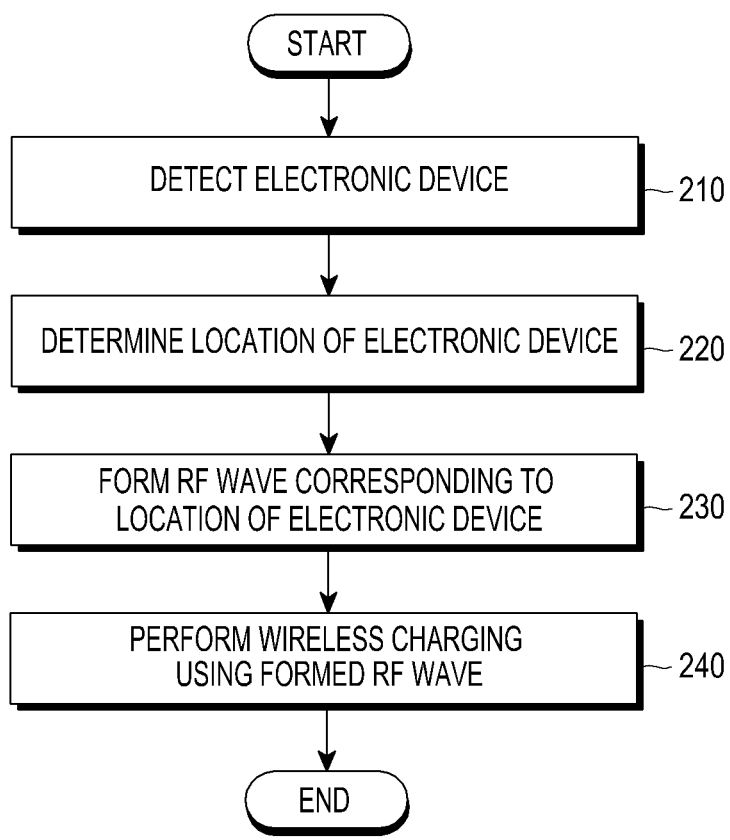
FIG. 2 is a flowchart illustrating a control method of a wireless power transmitter according to various embodiments of the present disclosure.

FIG. 2 is a flowchart illustrating a control method of a wireless power transmitter according to various embodiments of the present disclosure. Hereinafter, the fact that the wireless power transmitter performs a predetermined operation indicates that a processor of the wireless power transmitter performs the predetermined operation or the processor may control another piece of hardware to perform the predetermined operation. Also, the fact that the wireless power transmitter stores predetermined information indicates that a memory included in the wireless power transmitter stores the predetermined information.

In operation 210, the wireless power transmitter detects an electronic device. According to various embodiments of the present disclosure, the wireless power transmitter transmits detection RF waves in a plurality of directions. The wireless power transmitter may insert direction information into detection RF waves respectively corresponding to the plurality of directions, and may transmit the same. For example, when a detection RF wave is formed in a first direction, the wireless power transmitter may include information on the first direction in the detection RF wave, and may transmit the same. When a detection RF wave is formed in a second direction, the wireless power transmitter may include information on the second direction in the detection RF wave, and may transmit the same. The wireless power transmitter may modulate an RF wave using various modulation schemes, such as an amplitude modulation (AM), a frequency modulation (FM), or the like and, accordingly, may insert information on a direction into an RF wave and transmit the same. That is, the wireless power transmitter may use an RF wave as a subcarrier for information on a direction.

In operation 220, the wireless power transmitter may determine the location of an electronic device. According to various embodiments of the present disclosure, the wireless power transmitter may determine a direction in which the electronic device is disposed. The architecture through which the wireless power transmitter determines a direction in which the electronic device is disposed or the location of the electronic device will be described in detail later.

In operation 230, the wireless power transmitter may form an RF wave corresponding to the location of an electronic device. According to an embodiment, the wireless power transmitter may form an RF wave in a direction in which the electronic device is disposed. Here, the fact that the wireless power transmitter forms an RF wave in the direction in which the electronic device is disposed may indicate that the electronic device controls at least one of the phase and amplitude of each patch antenna such that sub-RF waves create constructive interference at one or more points in the direction in which the electronic device is disposed. The wireless power transmitter may receive, from the electronic device, reception power related information associated with power received by the electronic device and, accordingly, may maintain the formation of the RF wave or adjust the RF wave to reform an RF wave. For example, when the reception power related information satisfies a predetermined condition, the wireless power transmitter may maintain the formation of the RF wave. When the reception power related information does not satisfy the predetermined condition, the wireless power transmitter may reform an RF wave by adjusting the magnitude of power applied to a patch antenna. That is, until the reception power related information received from the electronic device satisfies the predetermined condition, the wireless power transmitter may adjust an RF wave. The reception power related information may indicate information associated with power received by the electronic device. For example, the electronic device may include a rectifier that rectifies wirelessly received power. When the magnitude of wirelessly received power is high, the voltage at an output end of the rectifier may be high. When the magnitude of wirelessly received power is low, the voltage at the output end of the rectifier may be low. That is, the magnitude of the voltage at the output end of the rectifier is associated with the magnitude of power received by the electronic device and thus, the voltage at the output end of the electronic device may be included in the reception power related information. The reception power related information may include any information that is associated with the magnitude of power that the electronic device receives, and may include electrical information associated with various locations, for example, the voltage at an input end of the rectifier, the current at the input end of the rectifier, the power at the input end of the rectifier, the voltage at the output end of the rectifier, the current at the output end of the rectifier, the power at the output end of the rectifier, or the like. According to other embodiments, the wireless power transmitter may directly determine the location of the electronic device. In this instance, the wireless power transmitter may control at least one of the phase and the amplitude of each of the patch antennas such that sub-RF waves create constructive interference at the location of the electronic device. In operation 240, the wireless power transmitter may perform wireless charging or wireless power transmission using a formed RF wave.

Figure 3A:
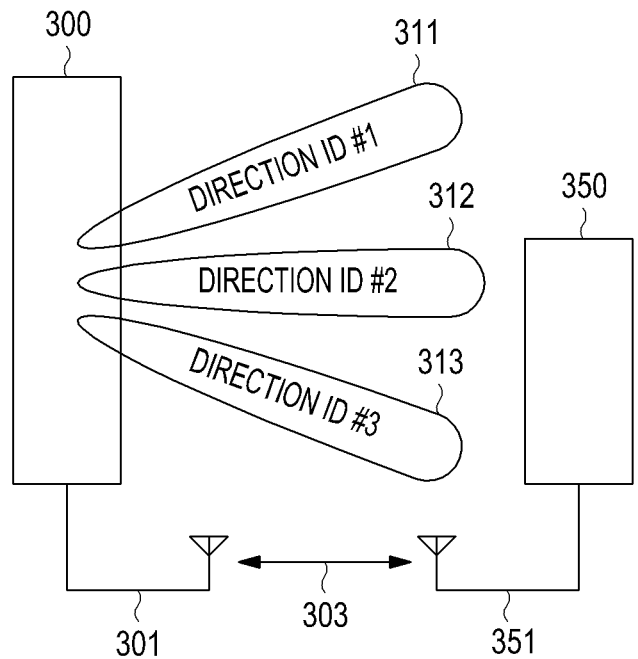
FIGS. 3A, 3B, and 3C are conceptual diagrams illustrating an operation of a wireless power transmitter according to various embodiments of the present disclosure.
Figure 3B:
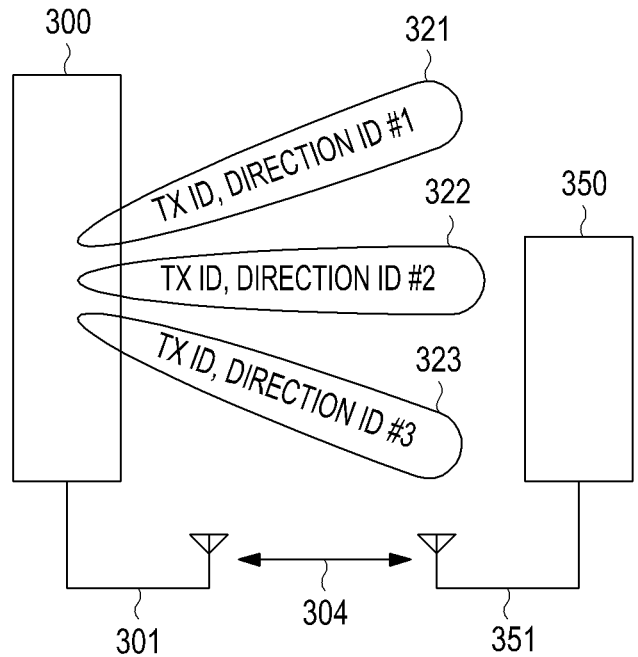
Figure 3C:
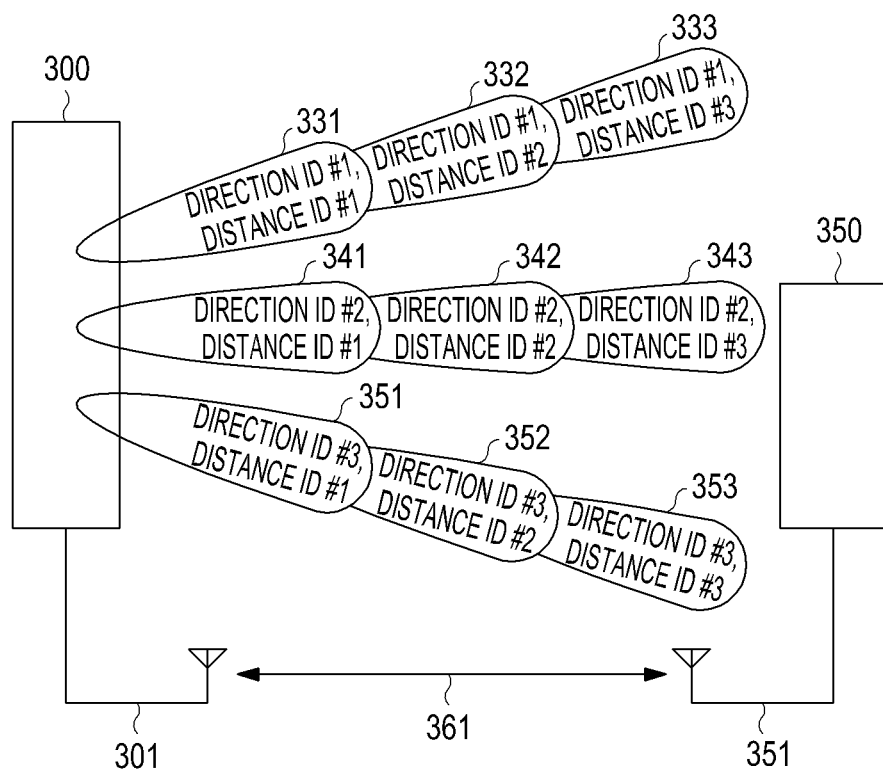

FIGS. 3A to 3C are conceptual diagrams illustrating an operation of a wireless power transmitter according to various embodiments of the present disclosure.

Referring to FIG. 3A, a wireless power transmitter 300 may form a first RF wave 311 including first direction information (direction ID #1) in a first direction. The wireless power transmitter 300 may form a second RF wave 312 including second direction information (direction ID #2) in a second direction. The wireless power transmitter 300 may form a third RF wave 313 including third direction information (direction ID #3) in a third direction. According to various embodiments of the present disclosure, the wireless power transmitter 300 may sequentially form the first RF wave 311, the second RF wave 312, and the third RF wave 313. According to another embodiment of the present disclosure, the wireless power transmitter 300 may form at least two of the first RF wave 311, the second RF wave 312, and the third RF wave 313, at substantially the same time.

The wireless power transmitter 300 may receive a communication signal 303 from an electronic device 350 through a communication circuit 301 included separately from an antenna array. The electronic device 350 may be located in a direction corresponding to, for example, the second RF wave 312. Accordingly, the electronic device 350 may receive the second RF wave 312 through a power reception antenna array. The electronic device 350 may extract second direction information (direction ID #2) from the second RF wave 312 received through an antenna array. The electronic device 350 may transmit the communication signal 303 including second direction information (direction ID #2) through a communication circuit 351. The communication signal 303 may include identification information of the electronic device 350. The wireless power transmitter 300 may extract the second direction information (direction ID #2) from the received communication signal 303. Accordingly, the wireless power transmitter 300 may form an RF wave in a direction corresponding to the second direction information (direction ID #2), that is, in the second direction. Accordingly, the wireless power transmitter 300 may detect the electronic device 350 relatively promptly, and may wirelessly transmit power.

According to various embodiments of the present disclosure, as illustrated in FIG. 3B, the wireless power transmitter 300 may include wireless power transmitter identification information and direction information in an RF wave, and may transmit the same. For example, the wireless power transmitter 300 may form a first RF wave 321 including identification information (Tx id) of the wireless power transmitter and first direction information (direction ID #1), in a first direction. The wireless power transmitter 300 may form a second RF wave 322 including identification information (Tx id) of the wireless power transmitter and second direction information (direction ID #2), in a second direction. The wireless power transmitter 300 may form a third RF wave 323 including identification information (Tx id) of the wireless power transmitter and third direction information (direction ID #3), in a third direction.

The wireless power transmitter 300 according to various embodiments of the present disclosure may wait for a communication signal from the electronic device 350 while forming the first RF wave 321, the second RF wave 322, and the third RF wave 323, and during a predetermined waiting time after the formation. According to a comparative example, a wireless power transmitter forms an RF wave in a first direction and waits for a communication signal during a predetermined waiting time. When the communication signal is not received during the waiting time, the wireless power transmitter forms an RF wave in a second direction. Accordingly, the wireless power transmitter according to the comparative example may require an amount of scanning time corresponding to a product of a waiting time and the number of directions in which RF waves are formed. The waiting time may be set as the amount of time taken when the electronic device 350 transmits a communication signal after driving, and may be, for example, 30 ms. The amount of time taken for forming an RF wave may use a unit corresponding to ns or µs. The amount of time taken for forming an RF wave may be a negligibly short amount of time when compared to the waiting time. When the wireless power transmitter according to the comparative example performs scanning, for example, in 100 directions, a total scanning time of 3 seconds may be taken. The wireless power transmitter 300 according to various embodiments of the present disclosure may receive a communication signal including direction information after forming RF waves including direction information in a plurality of directions, instead of waiting for a communication signal after forming a single RF wave. Accordingly, the wireless power transmitter 300 may determine a direction in which the electronic device 350 is located. Preferably, a communication signal may be received during a single waiting time. For example, the electronic device 350 may sequentially form RF waves in 100 directions, and the amount of time taken for forming the RF waves may be a negligibly short amount of time. The electronic device 350 may wait for a communication signal during a single waiting time, for example, during an amount of time corresponding to 30 ms, after forming RF waves and thus, may determine the direction in which the electronic device 350 is located during a relatively short amount of scanning time.

In this instance, the electronic device 350 may receive the second RF wave 322 through a power reception antenna array. The electronic device 350 may extract identification information (Tx id) of the wireless power transmitter and second direction information (direction ID #2) from the second RF wave 322 received through the antenna array. The electronic device 350 may transmit a communication signal 304 including identification information (Tx id) of the wireless power transmitter and second direction information (direction ID #2) through the communication circuit 351. The wireless power transmitter 300 may extract the identification information (Tx id) of the wireless power transmitter and the second direction information (direction ID #2) from the received communication signal 304. Accordingly, the wireless power transmitter 300 may form an RF wave, that is, power for charging, in a direction corresponding to the second direction information (direction ID #2), that is, in the second direction. In addition, the wireless power transmitter 300 may disregard an electronic device that receives power from another wireless power transmitter, which will be described in detail later. According to various embodiments of the present disclosure, the communication signal 303 transmitted by the electronic device 350 may further include at least one of identification information of the electronic device 350, information related to the type of electronic device 350, information related to an electric numerical value, reception power related information, protocol related information, and information related to the category of the electronic device 350, information related to the capability of the electronic device 350, hardware information of the electronic device 350, firmware information of the electronic device 350, and manufacturer information of the electronic device 350, in addition to direction information extracted from an RF wave. The identification information of the electronic device 350 is information for identifying the electronic device 350, for example, communication identification information for distinguishing the electronic device 350 in a communication network (e.g., BLE). The type of identification information may not be limited. The information associated with the type of electronic device 350 may be information indicating the type of device, such as information indicating whether a receiver is a wireless power receiving device or whether the receiver is simply a Bluetooth communication-enabled headphone. The information related to an electric numerical value may be information associated with an allowed voltage or allowed power for the electronic device 350. For example, the information may include information associated with the maximum value of power allowed at an output end of a rectifier of the electronic device 350 or information related to voltage at the output end of the rectifier in various states. The reception power related information may be information indicating the magnitude of power that the electronic device 350 receives from the wireless power transmitter 300. For example, the reception power related information may be a numerical value measured at various points in the electronic device 350, such as a voltage value measured at an output end of a rectifier, a current value measured at the output end of the rectifier, a power value measured at the output end of the rectifier, or the like, which will be described in detail later. The protocol related information may be information indicating the version of a protocol used by the electronic device 350. The information associated with the category of the electronic device 350 may be information indicating the category to which the electronic device 350 is classified among a plurality of categories. For example, electronic devices may be classified into various categories based on their capacities, and the information related to the category may be information indicating the category to which the corresponding electronic device 350 is classified. The information related to the capability of the electronic device 350 may include information indicating whether an NFC receiver is included, whether a power control algorithm is supported, whether power capability is adjustable, whether a function of maintaining a BLE communication connection is supported after power reception is completed, whether a function of testing the wireless power transmitter 300 is supported, or the like. The hardware information of the electronic device 350 may be defined based on, for example, an OEM, and may include information related to hardware. The firmware information of the electronic device 350 may be defined based on, for example, an OEM, and may include information related to firmware. The manufacturer information of the electronic device 350 may include information for identifying a manufacturer.

According to another embodiment, the electronic device 350 may obtain direction information corresponding to each of a plurality of received powers and strength information corresponding thereto, as shown in Table 1.

TABLE 1

| Direction information | Strength (RSSI) |
|---|---|
| first direction | A |
| second direction | B |
| third direction | C |

The electronic device 350 may include direction information, which is determined as direction information corresponding to the highest strength among direction information, in a communication signal, and may transmit the communication signal to the wireless power transmitter. Alternatively, the electronic device 350 may include both the received direction information and strength information corresponding thereto in a communication signal, and may transmit the communication signal to the wireless power transmitter. In this instance, the wireless power transmitter 300 may transmit power for charging in a direction in which the strength is determined as the highest strength based on the received information.

Referring to FIG. 3C, the wireless power transmitter 300 may form an RF wave including direction information and distance information. For example, the wireless power transmitter 300 may form an RF wave 331 in a first direction at a first distance, and may include first direction information (direction ID #1) and first distance information (distance ID #1) in the formed RF wave 331. The first distance information (distance ID #1) may be information associated with a distance from the wireless power transmitter 300, or information associated with the amplitude of an electric signal input to each of the patch antennas. Subsequently, the wireless power transmitter 300 may form an RF wave 332 in the first direction at a second distance, and may include the first direction information (direction ID #1) and second distance information (distance ID #2) in the formed RF wave 332. For example, the wireless power transmitter 300 may fix the degree of phase shifting corresponding to each of the patch antennas, and may increase the amplitude of an electric signal input to each of the patch antennas all together, thereby forming the RF wave 332 at the second distance which is a relatively longer distance. In addition, the wireless power transmitter 300 may form an RF wave 333 in the first direction at a third distance, and may include the first direction information (direction ID #1) and third distance information (distance ID #3) in the formed RF wave 333.

Subsequently, the wireless power transmitter 300 may change the formation direction of an RF wave to a second direction. For example, the wireless power transmitter 300 may change the formation direction of an RF wave from the first direction to the second direction by adjusting the degree of phase shifting corresponding to each patch antenna. In addition, the wireless power transmitter 300 may decrease the amplitude of an electric signal input to each patch antenna all together, thereby changing the formation distance of the RF wave from the third distance to the first distance again. Accordingly, the wireless power transmitter 300 may form an RF wave 341 in the second direction at the first distance, and may include the second direction information (direction ID #2) and first distance information (distance ID #1) in the formed RF wave 341. The wireless power transmitter 300 may fix the formation direction of an RF wave to the second direction, and may increase the amplitude of an electric signal input to each patch antenna all together. Accordingly, the wireless power transmitter 300 may form an RF wave 342 in the second direction at the second distance, and may include the second direction information (direction ID #2) and second distance information (distance ID #2) in the formed RF wave 342. As describe above, the wireless power transmitter 300 may form RF waves 331, 332, 333, 341, 342, 343, 351, 352, and 353 in various directions (the first direction, the second direction, and the third direction) at various distances (the first distance, the second distance, and the third distance), and may include corresponding direction information (first direction information, second direction information, and third direction information) and corresponding distance information (first distance information, second distance information, and third distance information) in each of the RF waves 331, 332, 333, 341, 342, 343, 351, 352, and 353.

The electronic device 350 may extract distance information and direction information from a received RF wave. For example, the electronic device 350 may be located in the second direction at the third distance from the wireless power transmitter 300. The electronic device 350 may receive the RF wave 343, and may extract the second direction information (direction ID #2) and the third distance information (distance ID #3) from the RF wave 343. The electronic device 350 may transmit a communication signal 361 including the second direction information (direction ID #2) and the third distance information (distance ID #3) to the wireless power transmitter 300 through a communication circuit 351. The wireless power transmitter 300 may determine the direction information and the distance information of the electronic device 350 from the communication signal 361, that is, the second direction information (direction ID #2) and the third distance information (distance ID #3). The wireless power transmitter 300 may form an RF wave for charging in the determined direction at the determined distance.

The electronic device 350 may receive a plurality of RF waves. For example, the electronic device 350 may receive a plurality of RF waves 341, 342, and 343 formed in the second direction. In this instance, the electronic device 350 may include, in the communication signal 361, direction information and distance information corresponding to the RF wave 343 received with the highest strength among the received RF waves 341, 342, and 343, and may transmit the communication signal 361. Alternatively, the electronic device 350 may transmit direction information and distance information of each of the plurality of received RF waves, and strength information of the RF waves in the communication signal 361, and may transmit the communication signal 361 to the wireless power transmitter 300. The wireless power transmitter 300 may determine direction information and distance information corresponding to an RF wave having the highest strength included in a communication signal, as the direction and distance of the electronic device 350.

According to another embodiment of the present disclosure, the wireless power transmitter 300 may form a plurality of RF waves in the fixed direction at different distances. In this instance, the wireless power transmitter 300 may form RF waves including only distance information. For example, the wireless power transmitter 300 may form a plurality of RF waves including direction information during a direction scanning period as illustrated in FIG. 3A, may receive a first communication signal from the electronic device 350, and may determine the direction in which the electronic device 350 is located based on the first communication signal. Subsequently, the wireless power transmitter 300 may form a plurality of RF waves including distance information in the determined distance during a distance scanning period, may receive a second communication signal from the electronic device 350, and may determine a distance at which the electronic device 350 is located based on the second communication signal. Alternatively, the wireless power transmitter 300 may detect the direction of the electronic device 350 using various different schemes, may form a plurality of RF waves including distance information in the detected direction, may receive a communication signal from the electronic device 350, and may determine a distance at which the electronic device 350 is located based on the communication signal.

Figure 4:
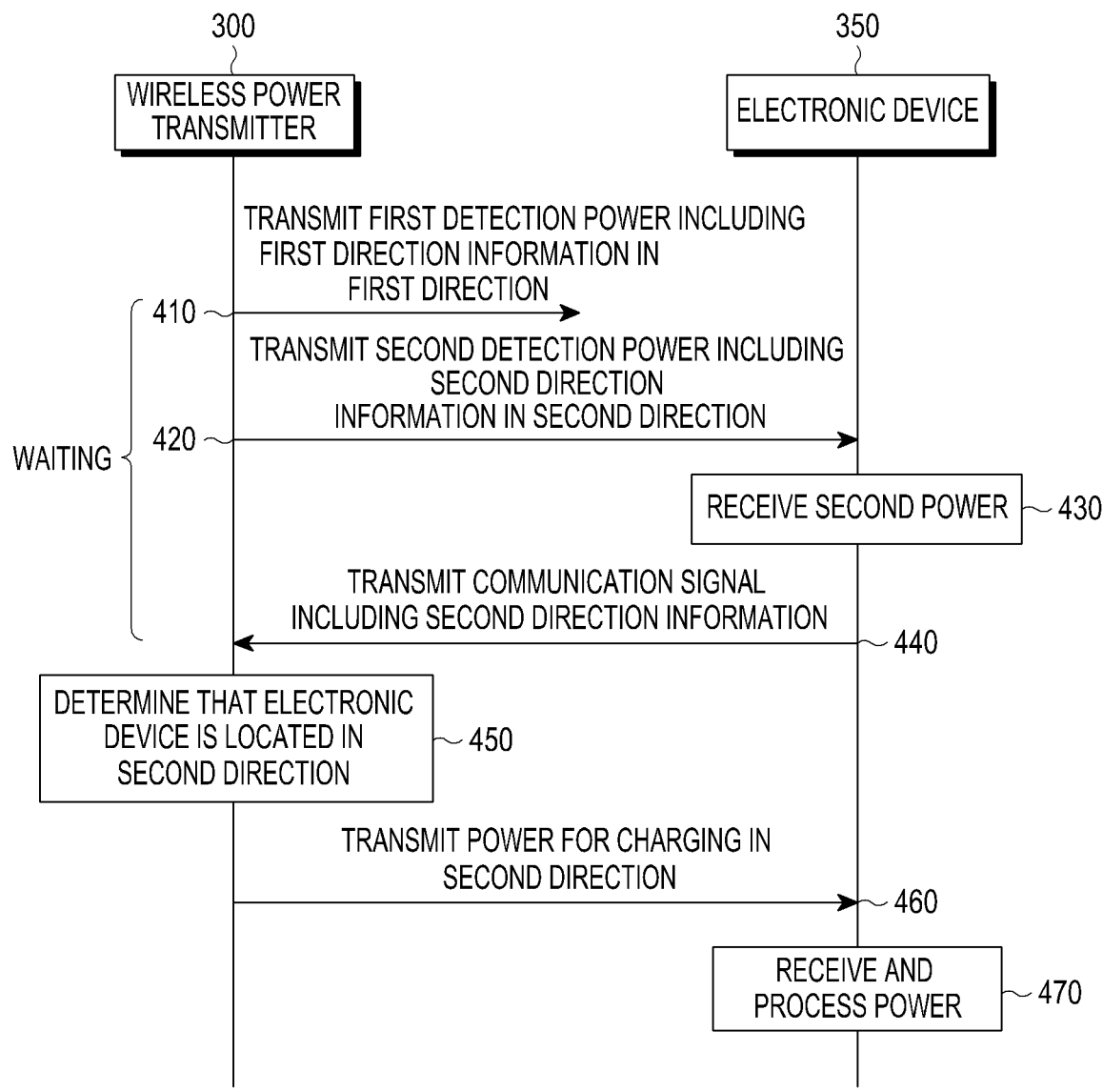
FIG. 4 is a flowchart illustrating a control method of a wireless power transmitter according to various embodiments of the present disclosure.

FIG. 4 is a flowchart illustrating a control method of a wireless power transmitter according to various embodiments of the present disclosure.

In operation 410, the wireless power transmitter 300 may transmit first power including first direction information, in a first direction. Here, transmitting the first power may indicate, for example, forming the first RF wave 311 of FIG. 3A. In operation 420, the wireless power transmitter 300 may transmit second power including second direction information, in a second direction. The wireless power transmitter 300 may wait for a communication signal from the electronic device 350 in the middle of transmitting power in a plurality of directions. A waiting time may be set in advance by taking into consideration power processing and transmission of a communication signal, and has no limitation.

In operation 430, the electronic device 350 may receive the second power. The electronic device 350 may be located in the second direction in which the second power is transmitted and, accordingly, may receive the second power. In operation 440, the electronic device 350 may transmit a communication signal including second direction information. The electronic device 350 may receive the first power. In this instance, the electronic device 350 is located in the second direction and thus, the magnitude of the received second power may be relatively higher and the magnitude of the first power may be relatively lower. When the magnitude of received power is greater than or equal to a predetermined threshold value, the electronic device 350 according to various embodiments of the present disclosure may extract direction information from the received power, and may transmit a communication signal including the direction information. Accordingly, the electronic device 350 may disregard the first power having a magnitude less than or equal to the threshold value, and may extract the second direction information from the second power having a magnitude greater than or equal to the threshold value.

In operation 450, the wireless power transmitter 300 may determine that the electronic device 350 is located in the second direction. The wireless power transmitter 300 may extract direction information from the received communication signal. In operation 460, the wireless power transmitter 300 may transmit power in the second direction. In operation 470, the electronic device 350 may receive and process the power. For example, the electronic device 350 may rectify the received power and convert or regulate the rectified power. According to the above described process, the wireless power transmitter 300 may detect an electronic device during a waiting time. A wireless power transmitter according to a comparative example uses a scheme that transmits power in a first direction, waits for a communication signal during a waiting time, transmits power in a second direction when a communication signal is not detected, and waits for a communication signal again during a waiting time. Accordingly, the wireless power transmitter corresponding to various embodiments may relatively promptly detect a charging target electronic device than the wireless power transmitter according to the comparative example.

Figure 5A:
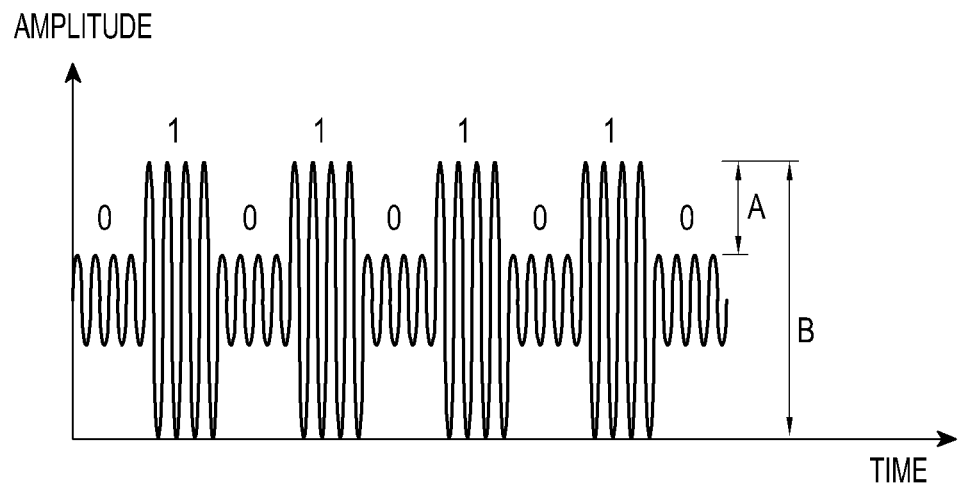
FIG. 5A is a diagram illustrating a waveform of power transmitted from a wireless power transmitter according to various embodiments of the present disclosure.

FIG. 5A is a diagram illustrating a waveform of power transmitted from a wireless power transmitter according to various embodiments of the present disclosure.

A wireless power transmitter forms an RF wave including direction information based on, for example, an AM scheme. The wireless power transmitter may form an RF wave including, for example, first direction information of "010101010". The wireless power transmitter may assign a relatively higher amplitude (B) to binary information of "1", and may assign an amplitude that is A shorter than the amplitude B to binary information of "0". The electronic device may receive an RF wave, and may extract the first direction information of "010101010" by modulating the received RF wave. The electronic device may transmit a communication signal including first direction information through a communication circuit. The above described AM modulation scheme is merely an example, and the wireless power transmitter may include direction information in an RF wave using various modulation schemes that use an RF wave as a subcarrier. The wireless power transmitter may modulate an RF wave using at least one of identification information, direction information, or position information.

Figure 5B:
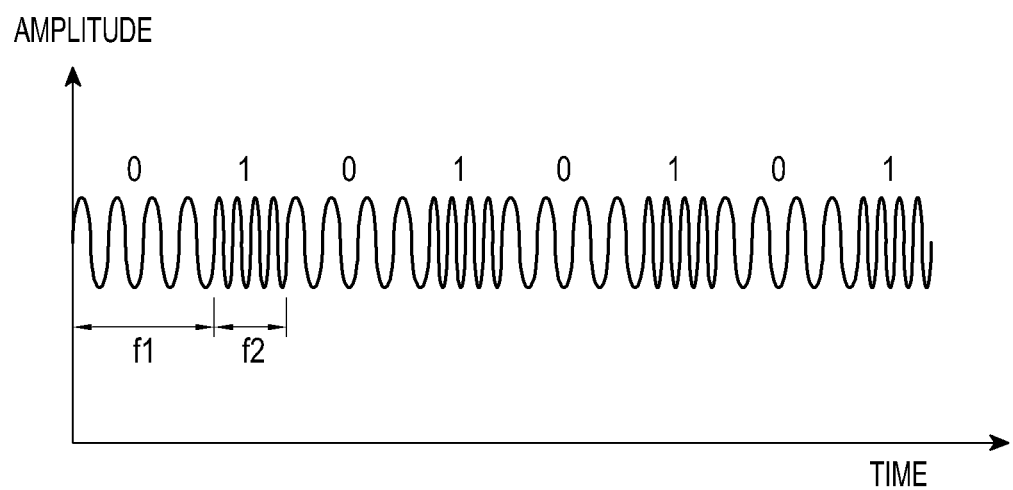
FIG. 5B is a diagram illustrating an RF wave including direction information based on an FM scheme.

FIG. 5B is a diagram illustrating an RF wave including direction information based on an FM scheme. The wireless power transmitter may modulate the first direction information of "01010101" based on an FM scheme. For example, the wireless power transmitter may allocate a frequency of f1 to binary information of "0", and may allocate a frequency of f2 to binary information of "1". The electronic device may receive an RF wave, and may extract the first direction information of "01010101" by modulating the received RF wave.

Figure 6:
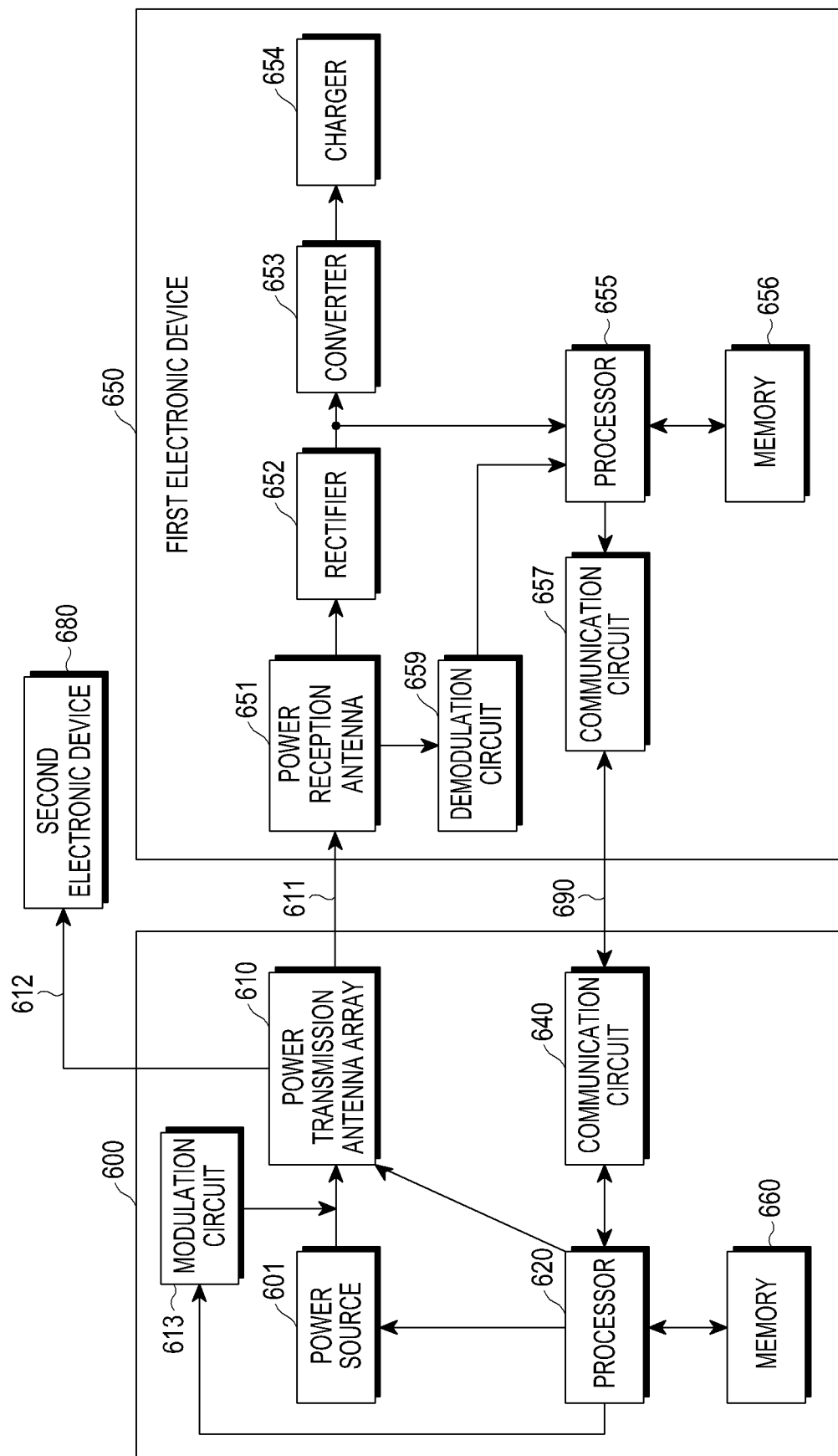
FIG. 6 is a block diagram illustrating a wireless power transmitter and a wireless power receiver according to various embodiments of the present disclosure.

FIG. 6 is a block diagram illustrating a wireless power transmitter and a wireless power receiver according to various embodiments of the present disclosure.

A wireless power transmitter 600 may include a power source 601, a power transmission antenna array 610, a modulation circuit 613, a processor 620, a memory 660, and a communication circuit 640. Any device capable of wirelessly receiving power can be used as a first electronic device 650. The first electronic device 650 may include a power reception antenna 651, a rectifier 652, a converter 653, a charger 654, a processor 655, a memory 656, a communication circuit 657, and a demodulation circuit 659. Detailed elements of a second electronic device 680 are not illustrated for ease of description. The second electronic device 680 may include, for example, elements substantially the same as those of the first electronic device 650.

The power source 601 may provide power to be transmitted to the power transmission antenna array 610. The power source 601 may provide, for example, direct current (DC) power. In this instance, an inverter (not illustrated), which converts DC power into AC power, and transfers the same to the power transmission antenna array 610, may be further included in the wireless power transmitter 600. According to another embodiment, the power source 601 may provide AC power to the power transmission antenna array 610.

The power transmission antenna array 610 may include a plurality of patch antennas. For example, a plurality of patch antennas as illustrated in FIG. 1 may be included in the power transmission antenna array 610. There is no limit to the number of the plurality of patch antennas or arrangement thereof. The power transmission antenna array 610 may form an RF wave using power provided from the power source 601. The power transmission antenna array 610 may form an RF wave in a predetermined direction according to control of the processor 620. Here, forming an RF wave in a predetermined direction indicates controlling at least one of the amplitudes and the phases of sub-RF waves such that the sub-RF waves create constructive interference at one point in the predetermined direction.

The processor 620 may perform control such that the power transmission antenna array 610 form a sub-RF wave, that is, a pilot signal, in each of the plurality of directions. The memory 660 may store a program or an algorithm for generating a sub-RF wave, that is, a pilot signal, in each of the plurality of directions. The processor 620 may control at least one of the phase and the amplitude of each patch antenna of the power transmission antenna array 610 using the program or algorithm stored in the memory 660.

The processor 620 may control a modulation circuit 613 to modulate a signal provided from the power source 601. The processor 620 may control the modulation circuit 613 to modulate a signal provided from the power source 601 using modulation information corresponding to at least one of direction information and distance information. For example, when a first power 611 is transmitted in a first direction, the processor 620 may control the modulation circuit 613 such that a signal provided from the power source 601 is modulated using modulation information corresponding to the first direction information. When power 612 is transmitted in a second direction, the processor 620 may control the modulation circuit 613 such that a signal provided from the power source 601 is modulated using modulation information corresponding to the second direction information. The memory 660 may include modulation information corresponding to a plurality of directions, and the processor 620 may control the modulation circuit 613 using the modulation information. Accordingly, the power transmission antenna array 610 may provide the power 612 to the second electronic device 680. The power for detection may have a magnitude which is enough to wake up the communication circuit 657 or the communication circuit 657 and the processor 655. According to various embodiments of the present disclosure, the processor 620 and 655 may include one or more of a central processing unit, an application processor, and a communication processor (CP). The processor 620 and 655, for example, may carry out operations or data processing relating to the control and/or communication of at least one other element of the wireless power transmitter 600 or the first electronic device 650. The processor 620 may be embodied as a micro controlling unit (MCU), a mini computer, or an FPGA.

The power reception antenna 651 of the first electronic device 650 may receive the first power 611. The demodulation circuit 659 may demodulate the first power 611, and the processor 655 may obtain a demodulation result. The processor 655 may obtain at least one of direction information and distance information included in the first power 611, from the demodulation result. The demodulation circuit 659 may be disposed between the output end of the rectifier 652 and the processor 655, depending on an embodiment. The processor 655 may transmit a communication signal 690 including at least one of direction information and distance information to the communication circuit 640 of the wireless power transmitter 600. The processor 620 of the wireless power transmitter 600 may determine at least one of a direction and a distance in which the first electronic device 650 is located based on the direction information included in the communication signal 690, and may determine the formation direction and formation distance of an RF wave based on at least one of the determined direction and distance. That is, the processor 620 may control patch antennas of the power transmission antenna array 610 that generates sub-RF waves such that the sub-RF waves create constructive interface at a point in the determined direction. For example, the processor 620 controls patch antennas or a control means connected to the patch antennas, whereby at least one of the amplitude and the phase of a sub-RF wave generated from each of the patch antennas is controlled.

The processor 620 may control the power transmission antenna array 610 based on the direction of the first electronic device 650, whereby an RF wave is formed in the direction of the first electronic device 650. The processor 620 may identify the first electronic device 650 using information in the communication signal 690. The communication signal 690 may include a unique identifier or unique address of the electronic device. The communication circuit 640 may process the communication signal 690 and may provide information to the processor 620. The communication circuit 640 and a communication antenna (not illustrated) may be manufactured based on various communication schemes, such as Wi-Fi, Bluetooth, Zig-bee, near field communication (NFC), Bluetooth low energy (BLE), and the like, and the type of communication scheme is not limited. The communication signal 690 may include rated power information of the first electronic device 650. The processor 620 may determine whether to charge the first electronic device 650 based on at least one of a unique identifier, a unique address, and rated power information of the first electronic device 650.

In addition, the communication signal may be used for a process in which the wireless power transmitter 600 identifies the first electronic device 650, a process of allowing power transmission to the first electronic device 650, a process of requesting reception power related information from the first electronic device 650, a process of receiving reception power related information from the first electronic device 650, or the like. That is, the communication signal may be used for a subscription process, a command process, or a request process executed between the wireless power transmitter 600 and the first electronic device 650.

Any antenna capable of receiving an RF wave can be used as the power reception antenna 651. In addition, the power reception antenna 651 may be embodied in an array form including a plurality of antennas. AC power received by the power reception antenna 651 may be rectified into DC power by the rectifier 652. The converter 653 may convert the DC power into a desired voltage, and provide the same to the charger 654. The charger 654 may charge a battery (not illustrated). Although not illustrated, the converter 653 may provide converted power to a power management integrated circuit (PMIC) (not illustrated), and the PMIC (not illustrated) may provide power to various hardware of the first electronic device 650.

The processor 655 may monitor the voltage at the output end of the rectifier 652. For example, a voltmeter connected to the output end of the rectifier 652 may be further included in the first electronic device 650, and the processor 655 may receive a voltage value from the voltmeter, and may monitor the voltage at the output end of the rectifier 652. The processor 655 may provide information including a voltage value at the output end of the rectifier 652 to the communication circuit 657. The communication circuit 657 may transmit a communication signal including reception power related information using a communication antenna (not illustrated). The reception power related information may be information associated with the magnitude of received power, such as the voltage at the output end of the rectifier 652, and may include the magnitude value of the current at the output end of the rectifier 652. In this instance, those skilled in the art may readily understand that a voltmeter or an ammeter capable of measuring current at the output end of the rectifier 652 may be further included in the first electronic device 650. The ammeter may be embodied in various forms, such as a DC ammeter, an AC ammeter, a digital ammeter, or the like, and the type of ammeter may not be limited. The voltmeter may be embodied in various forms, such as an electro dynamic instrument voltmeter, electrostatic voltmeter, a digital voltmeter, or the like, and the type of voltmeter may not be limited. In addition, the location where the reception power related information is measured is not limited, including the output end of the rectifier 652 and any point of the first electronic device 650.

Furthermore, as described above, the processor 655 may transmit the communication signal 690 including identification information of the first electronic device 650 to the wireless power transmitter 600. The memory 656 may store a program or an algorithm capable of controlling various hardware of the first electronic device 650.

Figure 7A:
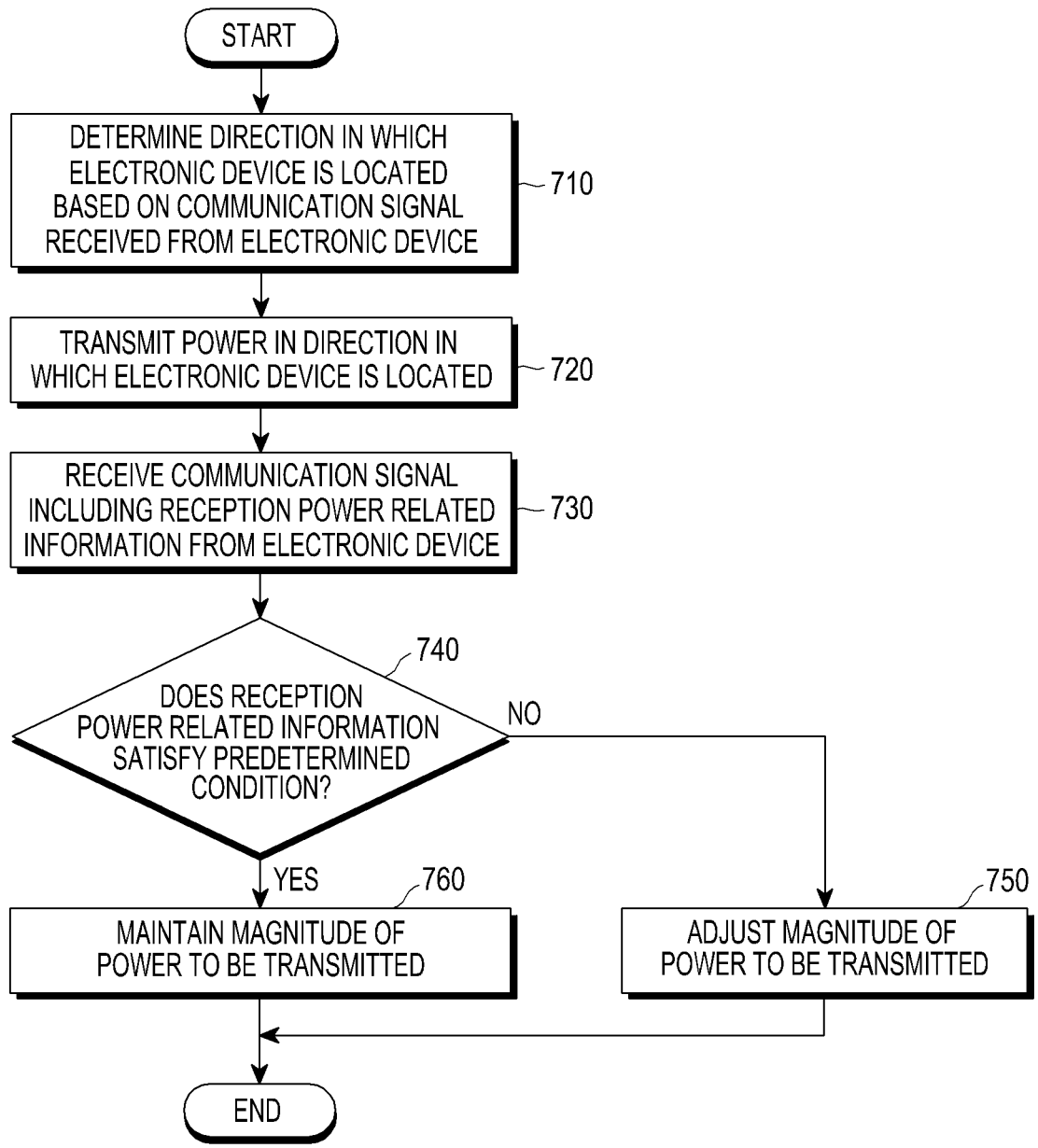
FIGS. 7A and 7B are flowcharts illustrating a control method of a wireless power transmitter according to various embodiments of the present disclosure.
Figure 7B:
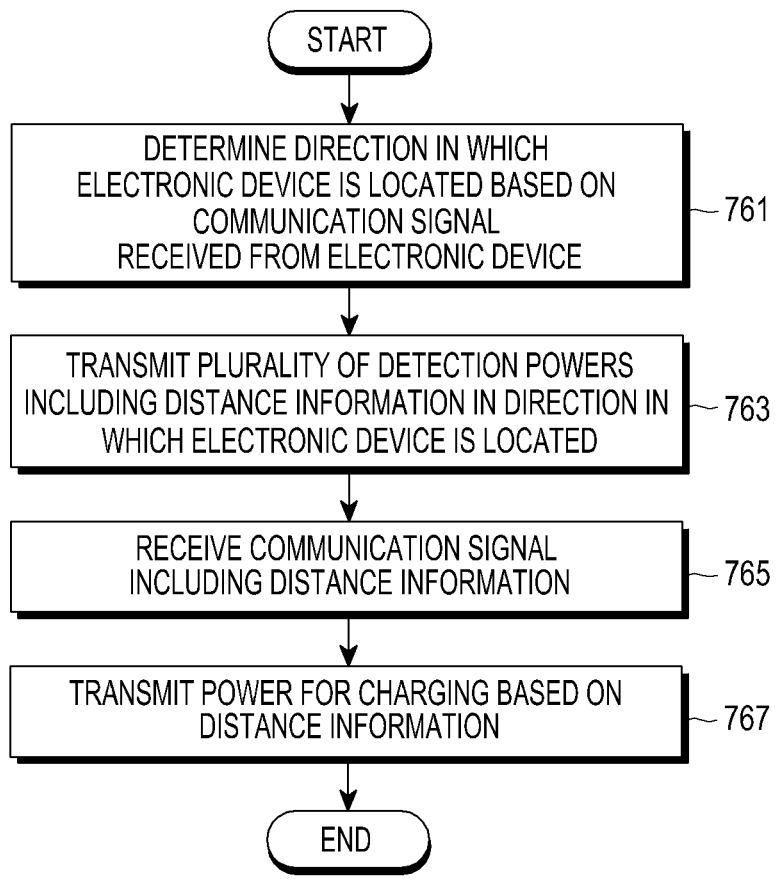
Figure 8:
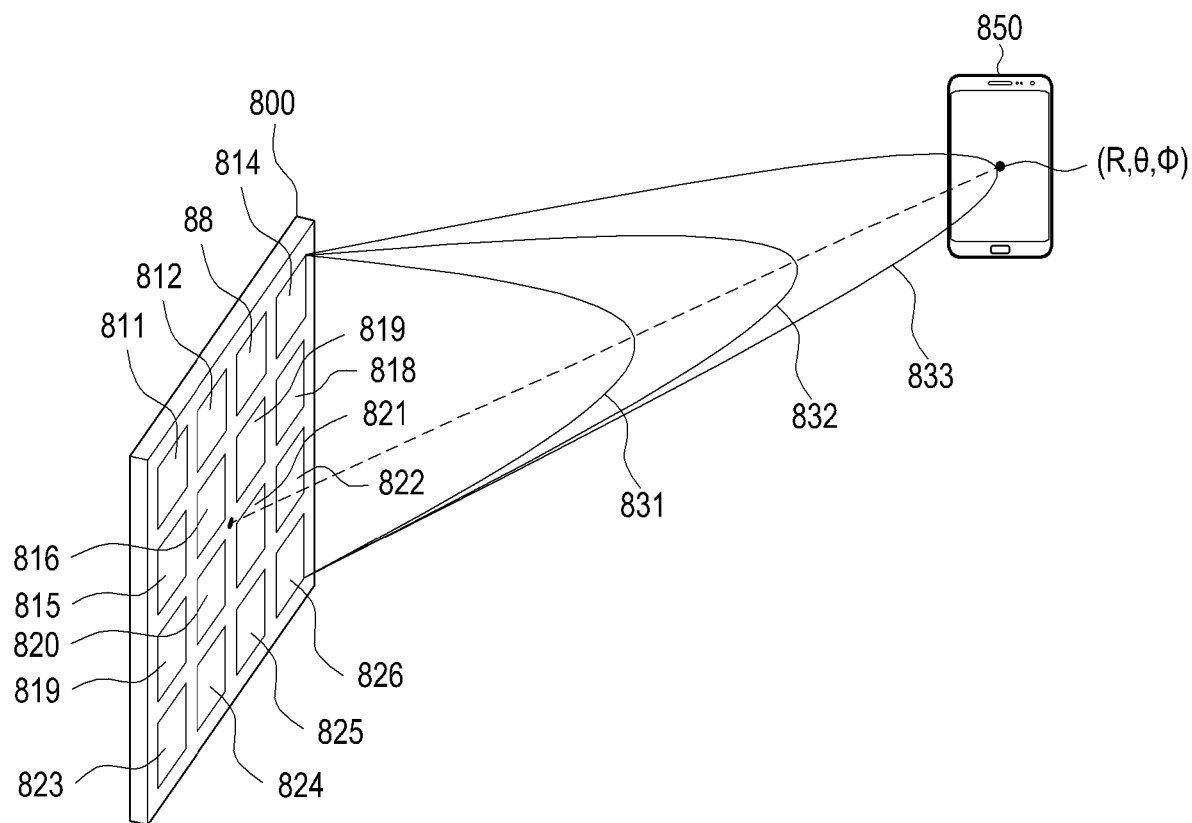
FIG. 8 is a conceptual diagram illustrating formation of an RF wave by a wireless power transmitter according to various embodiments of the present disclosure.

FIGS. 7A and 7B are flowcharts illustrating a control method of a wireless power transmitter according to various embodiments of the present disclosure. The embodiment of FIG. 7A will be described in more detail with reference to FIG. 8. FIG. 8 is a conceptual diagram illustrating formation of an RF wave by a wireless power transmitter according to various embodiments of the present disclosure.

As described in FIG. 8, in operation 710, a wireless power transmitter 800 may determine a direction in which an electronic device 850 is located based on a communication signal received from the electronic device 850. For example, the wireless power transmitter 800 may extract direction information from the communication signal, and may determine the direction ($\theta, \varphi$) of the electronic device 850 from the location of the wireless power transmitter 800, based on the extracted direction information.

In operation 720, the wireless power transmitter 800 may transmit power in the direction of the electronic device 850. For example, as illustrated in FIG. 8, the wireless power transmitter 800 may determine at least one of a phase and a amplitude for each patch antenna 811 to 826 such that a detection RF wave is formed in the direction ($\theta, \varphi$) extracted from the communication signal. For example, when it is determined that the electronic device 850 is disposed relatively to the right side, a relatively high delay is applied to a patch antenna disposed relatively on the left side, whereby sub-RF waves from each of the plurality of patch antennas 811 to 826 may create constructive interference relatively on the right side. Also, when it is determined that the electronic device 850 is disposed relatively above the wireless power transmitter 800, a relatively high delay is applied to a patch antenna disposed relatively on the upper side, whereby sub-RF waves from each of the plurality of patch antennas 811 to 826 may create constructive interference relatively on the upper side. The wireless power transmitter 800 may apply different delays to the patch antennas 811 to 826 disposed in two dimensions, whereby the phases of RF waves generated respectively by the patch antennas 811 to 826 may be formed to be different.

The wireless power transmitter 800 may determine the magnitude of power applied to each patch antenna 811 to 826 such that a detection RF wave 831 is formed to correspond to a first test distance. According to various embodiments of the present disclosure, the wireless power transmitter 800 may immediately determine the magnitude of a first test power provided to the plurality of patch antennas 811 to 826, without determining a distance. Here, the first test distance or the magnitude of the first test power may be a default value.

The wireless power transmitter 800 may form the detection RF wave 831 to correspond to the first test distance, using at least one of the determined phase and the determined amplitude of each patch antenna 811 to 826, and the determined power applied for each patch antenna 811 to 826.

In operation 730, the wireless power transmitter 800 may receive reception power related information from the electronic device 850. In operation 740, the wireless power transmitter 800 may determine whether the reception power related information satisfies a predetermined condition. For example, the wireless power transmitter 800 may determine whether voltage at an output end of a rectifier of the electronic device 850, which corresponds to the reception power related information, exceeds a predetermined threshold value.

When it is determined that the reception power related information does not satisfy the predetermined condition, the wireless power transmitter 800 may adjust the magnitude of power to be transmitted in operation 750. When the reception power related information does not satisfy the predetermined condition, the wireless power transmitter 800 may adjust power applied for each patch antenna 811 to 826 such that a detection RF wave 832 is formed to correspond to a subsequent test distance, whereby the detection RF wave 832 may be formed to correspond to the subsequent test distance. As described above, the wireless power transmitter 800 may immediately determine the magnitude of a subsequent test power without determining a test distance, and may apply the same to each patch antenna 811 to 826. Although the embodiment of FIG. 8 illustrates that the wireless power transmitter 800 increases a test distance, this is merely an example. The wireless power transmitter 800 may decrease a test distance. The wireless power transmitter 800 may adjust the magnitude of power applied to each patch antenna 811 to 826 until reception power related information satisfies the predetermined condition. For example, the wireless power transmitter 800 may adjust the magnitude of power applied to each patch antenna 811 to 826 until it is reported that voltage at the output end of the rectifier of the electronic device 850 has a numeric value exceeding a predetermined threshold value.

When the reception power related information satisfies the predetermined condition, the wireless power transmitter

800 may maintain power applied to each patch antenna for transmitting an RF wave in operation 760, thereby performing wireless charging or wireless power transmission. In the embodiment of FIG. 8, when a detection RF wave 833 is formed at a third test distance, it may be determined that the reception power related information satisfies the predetermined condition. The wireless power transmitter 800 may maintain the magnitude of power applied to each patch antenna 811 to 826 such that the detection RF wave 833 is formed to correspond to the third test distance. The wireless power transmitter 800 may determine that the distance to the electronic device 850 is the third test distance (R), or may control only power applied to each patch antenna 811 to 826 without determining the distance to the electronic device 850.

Referring to FIG. 7B, in operation 761, the wireless power transmitter 800 may determine the direction of the electronic device 850 based on a communication signal received from the electronic device. In operation 763, the wireless power transmitter 800 may transmit a plurality of detection RF waves or detection powers 831 to 833 including distance information, in the direction where the electronic device 850 is located. For example, the wireless power transmitter 800 may transmit detection RF wave 831 including first distance information, detection RF wave 832 including second distance information, and detection RF wave 833 including third distance information. The electronic device 850 may receive the detection RF wave 833, and may extract the third distance information from the detection RF wave 833. The electronic device 850 may transmit a communication signal including the extracted distance information (e.g., the third distance information) to the wireless power transmitter 800.

In operation 765, the wireless power transmitter 800 may receive the communication signal including the distance information. In operation 767, the wireless power transmitter 800 may transmit power based on the distance information extracted from the communication signal. The wireless power transmitter 800 may transmit the detection RF wave 833 to correspond to the extracted distance, as power for charging.

Figure 9A:
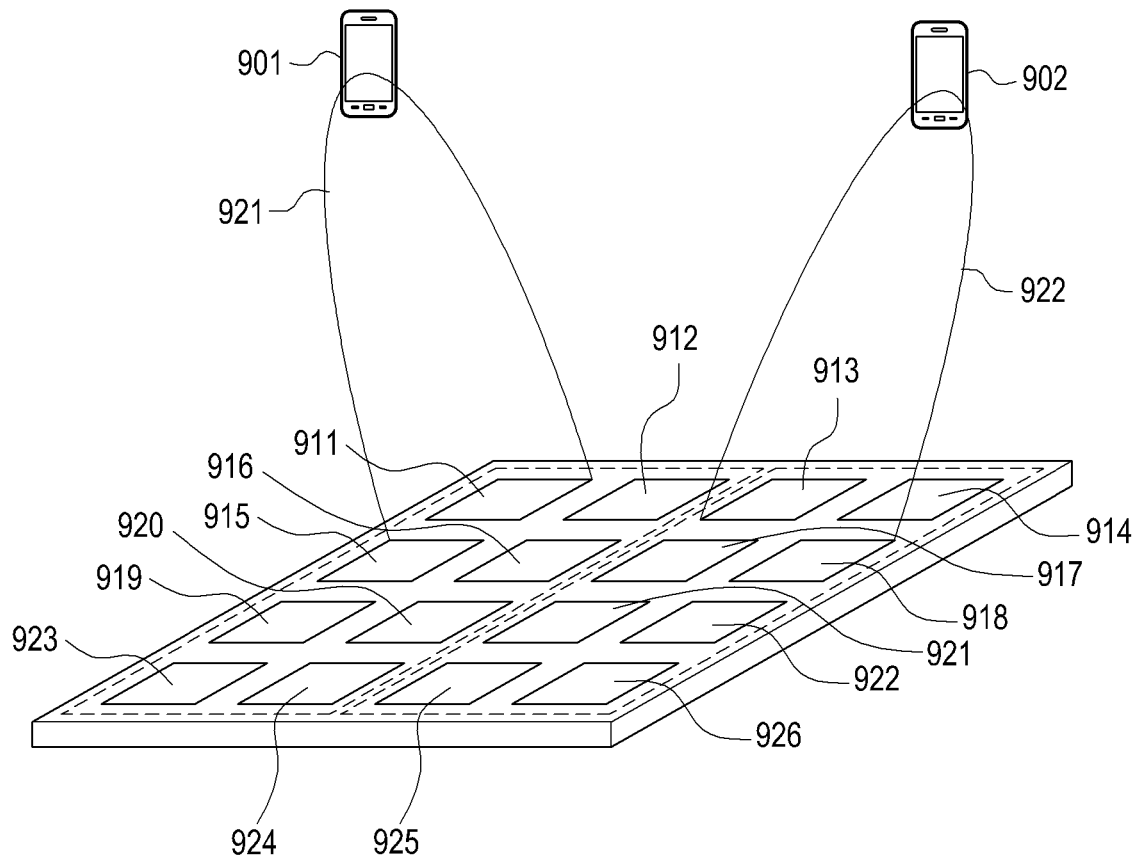
FIGS. 9A and 9B are conceptual diagrams illustrating a control method of a wireless power transmitter according to various embodiments of the present disclosure.

FIG. 9A is a conceptual diagram illustrating a control method of a wireless power transmitter according to various embodiments of the present disclosure. In the embodiment of FIG. 9A, a wireless power transmitter 900 may form RF waves 921 and 922 in a plurality of directions at substantially the same time. For example, the wireless power transmitter 900 may include a plurality of patch antennas 911 to 926. The wireless power transmitter 900 may form a first RF wave 921 in a first direction using a first part 911, 912, 915, 916, 919, 920, 923, and 924 of the plurality of patch antennas 911 to 926. In addition, the wireless power transmitter 900 may form a second RF wave 922 in a second direction using a second part 913, 914, 917, 918, 921, 922, 925, and 926 of the plurality of patch antennas 911 to 926. The wireless power transmitter 900 may include first direction information in the first RF wave 921, and may include second direction information in the second RF wave 922. A first electronic device 901 may receive the first RF wave 921 and extract the first direction information therefrom, and may transmit a first communication signal including the first direction information to the wireless power transmitter 900. In addition, a second electronic device 902 may receive the second RF wave 922 and extract the second direction information therefrom, and may transmit a second communication signal including the second direction information to the wireless power transmitter 900. The wireless power transmitter 900 may use the first communication signal and the second communication signal, and may determine that the first electronic device 901 is located in the first direction and the second electronic device 902 is located in the second direction.

Figure 9B:
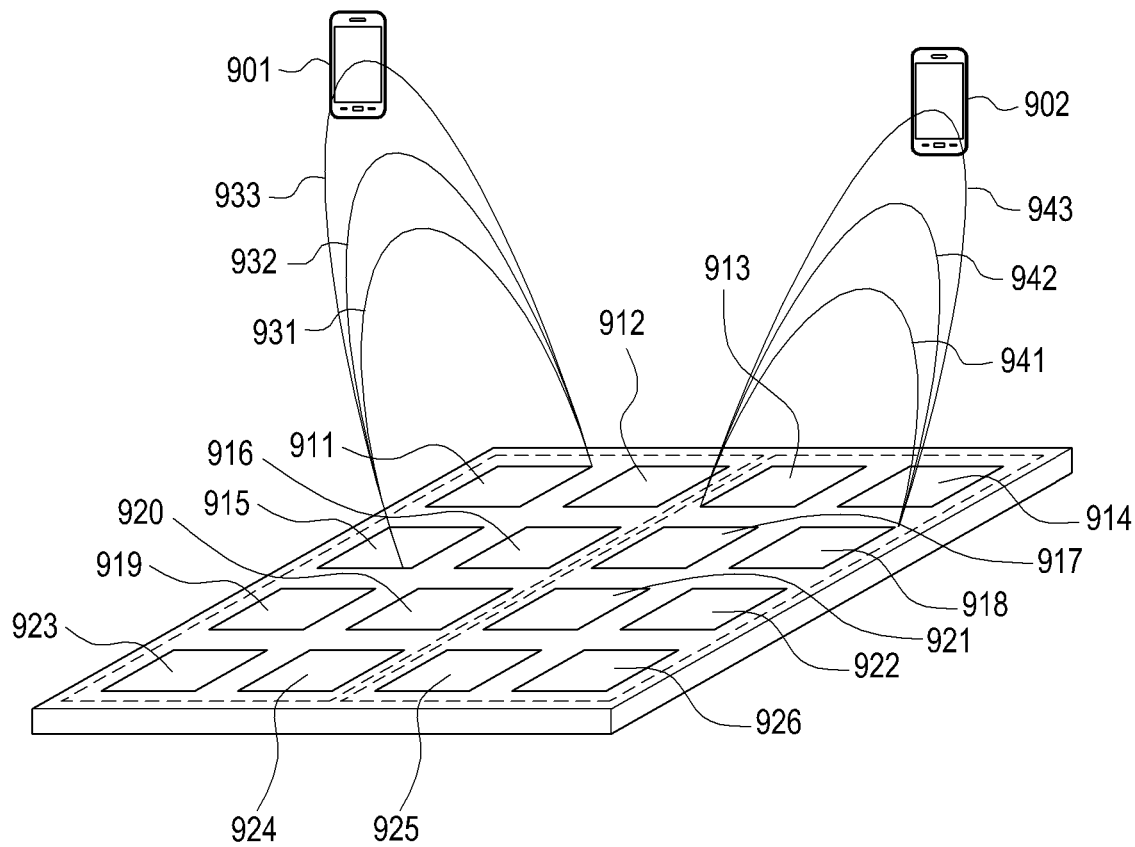

Referring to FIG. 9B, the wireless power transmitter 900 may form RF waves 931 to 933 in the first direction using a first part 911, 912, 915, 916, 919, 920, 923, and 924 of the plurality of patch antennas 911 to 926. For example, the wireless power transmitter 900 may receive a communication signal including reception power related information from the first electronic device 901. The wireless power transmitter 900 may adjust the magnitude of power until the reception power related information included in the communication signal satisfies a predetermined condition. In addition, the wireless power transmitter 900 may receive a communication signal including reception power related information from the second electronic device 902. The wireless power transmitter 900 may adjust the magnitude of power until the reception power related information included in the communication signal satisfies a predetermined condition. As described above, the wireless power transmitter 900 according to various embodiments of the present disclosure may determine a direction in which a plurality of electronic devices 901 and 902 is located at substantially the same time, and may determine the distances to the electronic devices 901 and 902, that is, more accurate locations.

According to another embodiment, the wireless power transmitter 900 may include distance information in RF waves 931, 933, and 933 in the first direction and RF waves 941, 942, and 943 in the second direction, respectively. The wireless power transmitter 900 may receive a communication signal including distance information from the first electronic device 901, and may receive a communication signal including distance information from the second electronic device 902. The wireless power transmitter 900 may extract distance information from the received communication signal, and may transmit power for communication to the first electronic device 901 and the second electronic device 902.

Figure 10:
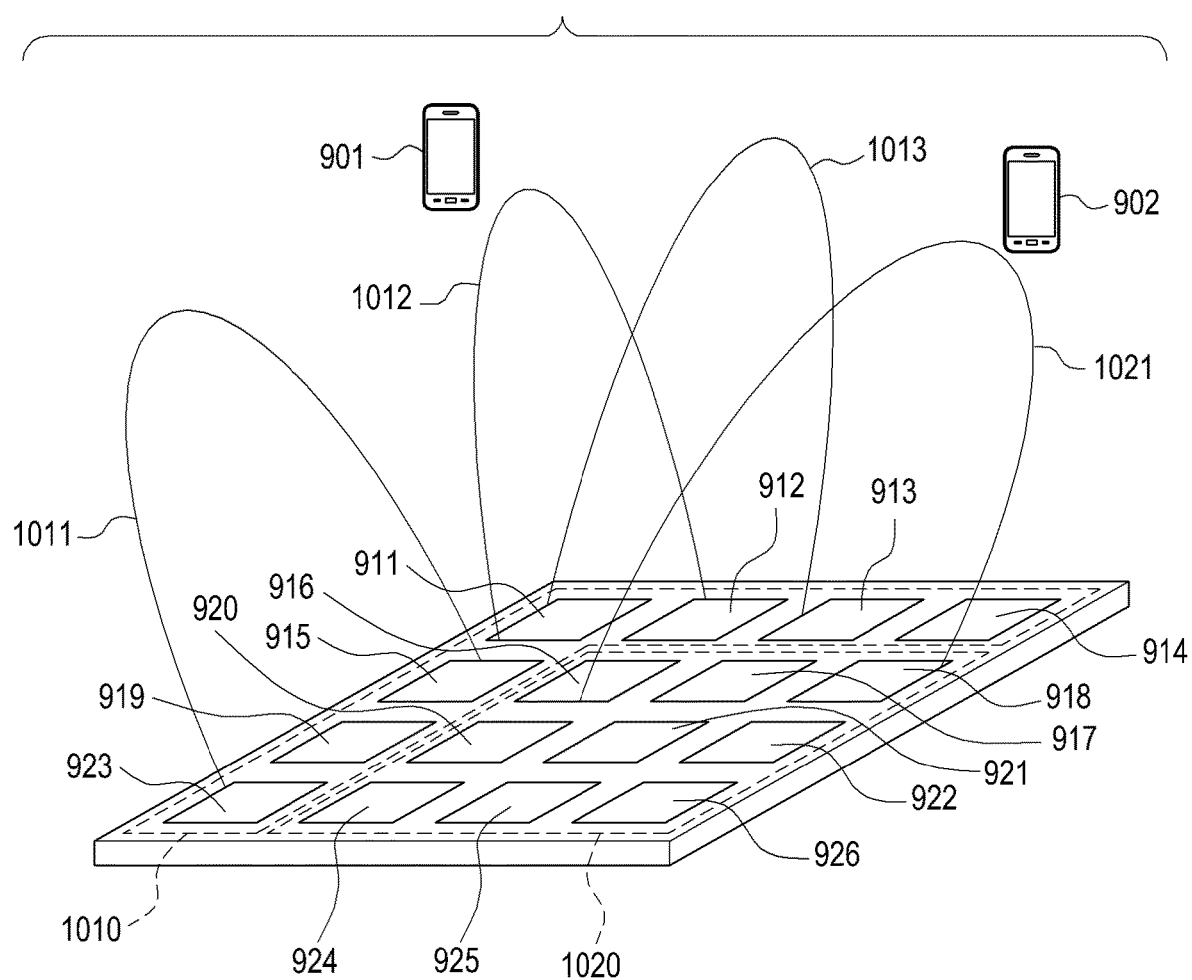
FIG. 10 is a conceptual diagram illustrating an operation of a wireless power transmitter according to various embodiments of the present disclosure.

FIG. 10 is a conceptual diagram illustrating an operation of a wireless power transmitter according to various embodiments of the present disclosure. Referring to FIG. 10, the first electronic device 901 may distinguish a plurality of patch antennas 911 to 926 into a group 1010 for detecting an electronic device and a group 1020 for power transmission. For example, the first electronic device 901 may set some patch antennas 911, 912, 913, 914, 915, 919, and 923 among the plurality of patch antennas 911 to 926 as the group 1010 for detecting an electronic device, and may set some patch antennas 916, 917, 918, 920, 921, 922, 924, 925, and 926 among the plurality of patch antennas 911 to 926 as the group 1020 for power transmission. The wireless power transmitter 900 may charge the second electronic device 902 of which the location has been identified, using the group 1020 for power transmission. For example, the wireless power transmitter 900 may detect second electronic device 902 in advance, and may form a second RF wave 1021 for charging the detected second electronic device 902.

The wireless power transmitter 900 may form detection RF waves 1011, 1012, and 1013 in a plurality of directions using the group 1010 for detection, in the middle of forming the second RF wave 1021 to the second electronic device 902. Accordingly, the wireless power transmitter 900 may form detection RF waves 1011, 1012, and 1013 in the plurality of directions, sequentially or at substantially the same time. As described above, the detection RF waves 1011, 1012, and 1013 may include direction information. The first electronic device 901 may receive, for example, the second detection RF wave 1012, and may extract second direction information from the second detection RF wave 1012. The first electronic device 901 may transmit a communication signal including second direction information to the wireless power transmitter 900. The wireless power transmitter 900 may analyze the received communication signal, and may determine that the first electronic device 901 is located in the second direction. The wireless power transmitter 900 may also transmit power to the first electronic device 901 newly detected by forming the RF wave in the second direction. The wireless power transmitter 900 may transmit power to the first electronic device using the group 1020 for power transmission. In this instance, the wireless power transmitter 900 may transmit power to the first electronic device 901 and the second electronic device 902 according to a time division scheme. Alternatively, the wireless power transmitter 900 may transmit power to the first electronic device 901 using a first part of the group 1020 for power transmission, and may transmit power to the second electronic device 902 using a second part of the group 1020 for power transmission. The wireless power transmitter 900 may change the number of patch antennas classified as the group 1020 for power transmission, as the number of charging target electronic devices changes.

Figure 11A:
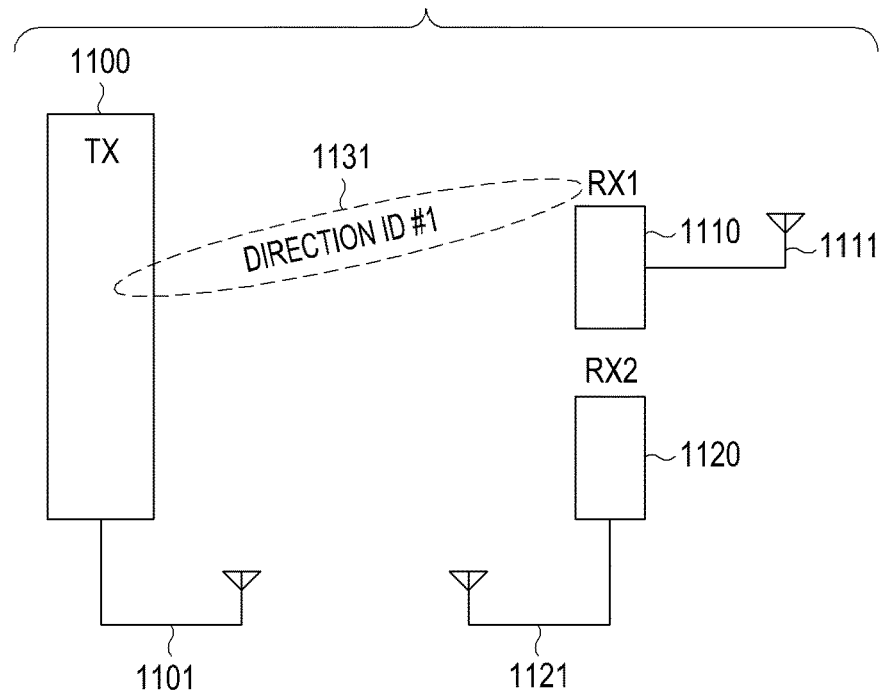
FIGS. 11A, 11B, and 11C are conceptual diagrams illustrating an operation of a wireless power transmitter according to various embodiments of the present disclosure.
Figure 11B:
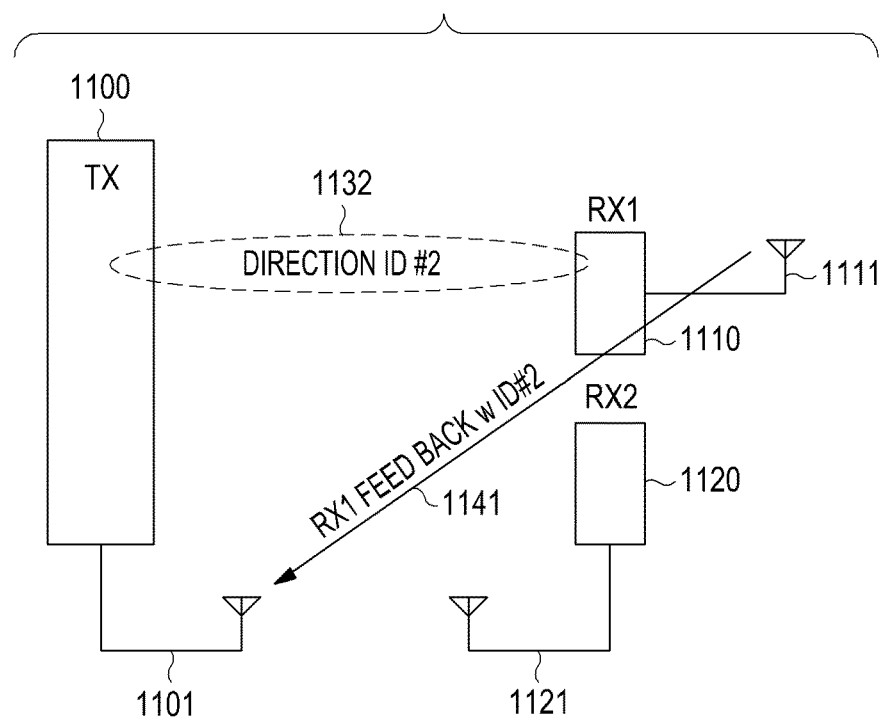
Figure 11C:
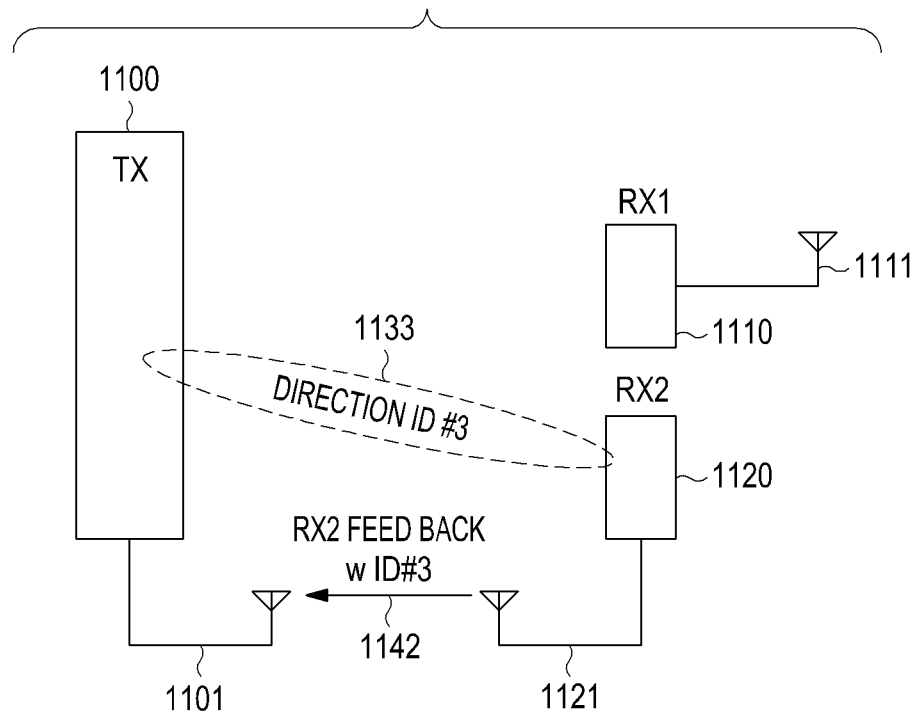
Figure 12:
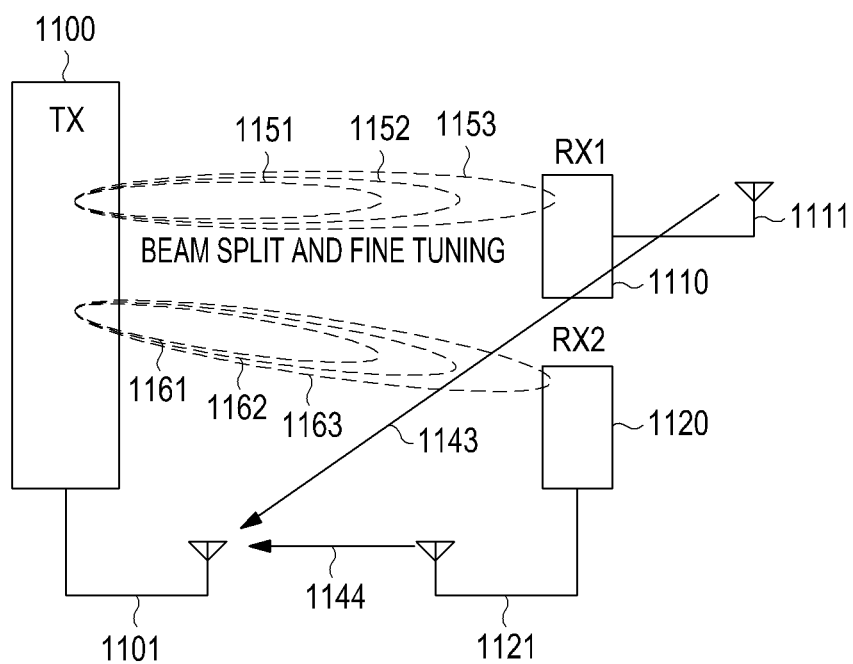
FIG. 12 is a conceptual diagram illustrating an operation of a wireless power transmitter according to various embodiments of the present disclosure.

FIGS. 11A to 11C are conceptual diagrams illustrating an operation of a wireless power transmitter according to various embodiments of the present disclosure. FIG. 12 is a conceptual diagram illustrating an operation of a wireless power transmitter according to various embodiments of the present disclosure.

Referring to FIGS. 11A, 11B, and 11C, a wireless power transmitter 1100 may form a first RF wave 1131 including first direction information (direction ID #1) in a first direction during a first time period. The wireless power transmitter 1100 may form a second RF wave 1132 including second direction information (direction ID #2) in a second direction during a second time period. A first electronic device 1110 may receive the second RF wave 1132, and may extract the second direction information (direction ID #2) from the second RF wave 1132. The first electronic device 1110 may transmit a communication signal 1141 including the second direction information (direction ID #2) to a communication circuit 1101 of the wireless power transmitter 1100 through a communication circuit 1111. The wireless power transmitter 1100 may form a third RF wave 1133 including third direction information (direction ID #3) in a third direction during a third time period. A second electronic device 1120 may receive the third RF wave 1133, and may extract the third direction information (direction ID #3) from the third RF wave 1133. The second electronic device 1120 may transmit a communication signal 1142 including the third direction information (direction ID #3) to the communication circuit 1101 of the wireless power transmitter 1100 through a communication circuit 1121. Accordingly, the wireless power transmitter 1100 may determine that the first electronic device 1110 is located in the second direction, and the second electronic device 1120 is located in the third direction.

Referring to FIG. 12, the wireless power transmitter 1100 may determine the accurate locations of the first electronic device 1110 and the second electronic device 1120, the directions of which have been recognized. As described above, the wireless power transmitter 1100 may receive communication signals 1143 and 1144 including reception power related information from the first electronic device 1110 and the second electronic device 1120. The wireless power transmitter 1100 may adjust the magnitude of power 1151, 1152, 1153, 1161, 1162, and 1163 to be transmitted, until the reception power related information included in the communication signals 1143 and 1144 satisfy a predetermined condition.

Figure 13:
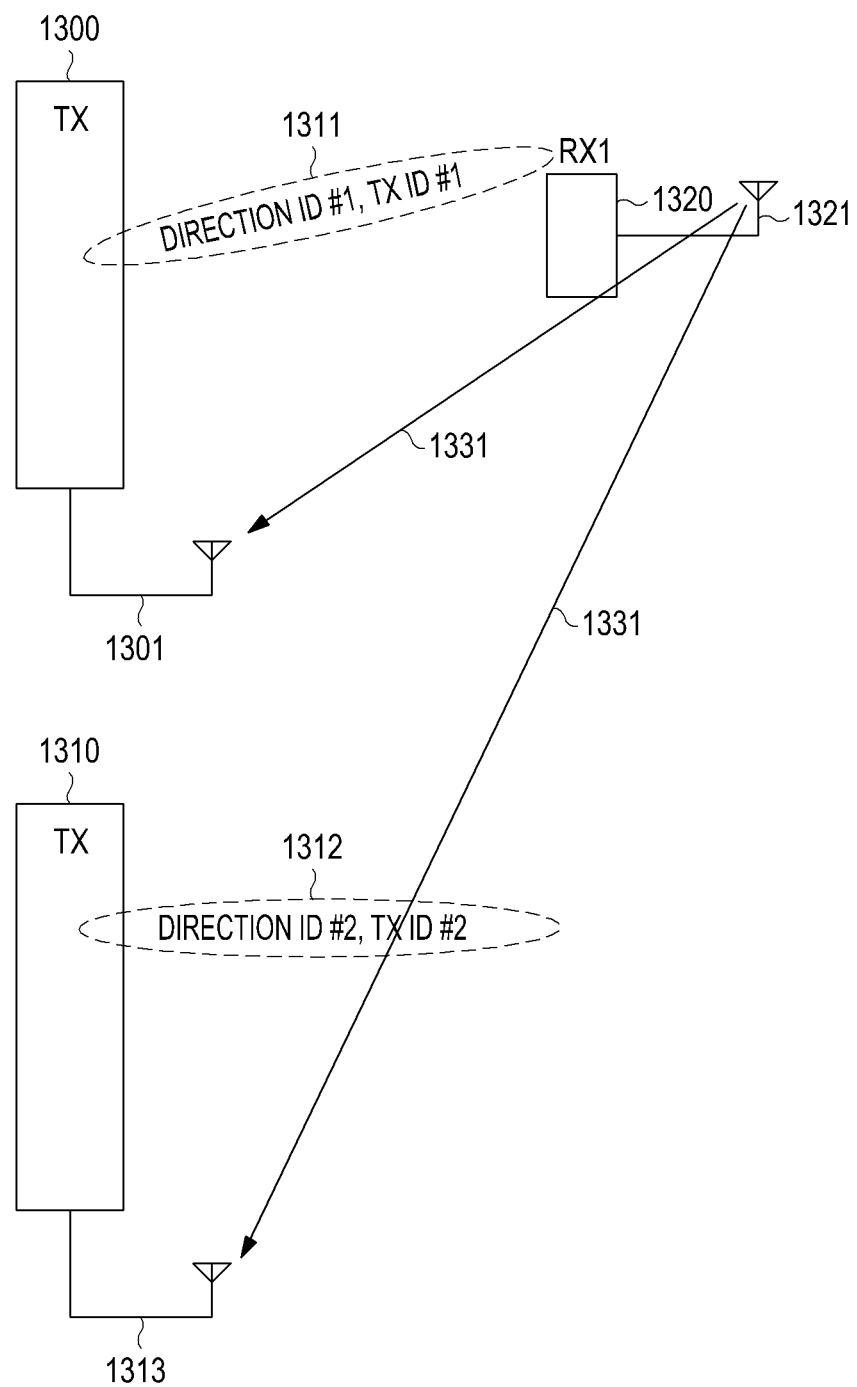
FIG. 13 is a conceptual diagram illustrating an operation of a wireless power transmitter for preventing cross connection according to various embodiments of the present disclosure.

FIG. 13 is a conceptual diagram illustrating an operation of a wireless power transmitter for preventing cross connection according to various embodiments of the present disclosure.

A plurality of wireless power transmitters 1300 and 1310 are positioned as illustrated in FIG. 13. The wireless power transmitters 1300 and 1310 may respectively include communication circuits 1301 and 1313. In addition, the electronic device 1320 may be located relatively closer to the wireless power transmitter 1300, and may be located relatively further from another wireless power transmitter 1310. In this instance, the electronic device 1320 may be paired with the wireless power transmitter 1300, whereby the efficiency in receiving power from the wireless power transmitter 1300 is higher than the efficiency in receiving power from the wireless power transmitter 1310. However, a distance that allows communication with a communication circuit 1313 of the another wireless power transmitter 1310 through a communication circuit 1321 of an electronic device 1320 is a relatively long distance and thus, there exists the probability of pairing between the electronic device 1320 and the another wireless power transmitter 1310.

The wireless power transmitter 1300 according to various embodiments of the present disclosure may form an RF wave 1311 including direction information (direction ID #1) and identification information (TX ID #1) of the wireless power transmitter. The another wireless power transmitter 1310 may form an RF wave 1312 including direction information (direction ID #2) and identification information (TX ID #2) of the wireless power transmitter. The electronic device 1320 may receive the RF wave 1311 including direction information (direction ID #1) and identification information (TX ID #1) of the wireless power transmitter. The electronic device 1320 may extract the direction information (direction ID #1) and the identification information (TX ID #1) of the wireless power transmitter from the RF wave 1311. The electronic device 1320 may transmit a communication signal 1331 including direction information (direction ID #1) and identification information (TX ID #1) of the wireless power transmitter. The wireless power transmitter 1300 and the another wireless power transmitter 1310 may receive the communication signal 1331. The wireless power transmitter 1300 may transmit wireless power to the electronic device 1320 based on the identification information (TX ID #1) of the wireless power transmitter included in the communication signal 1331. The another wireless power transmitter 1310 may disregard the electronic device 1320 based on the identification information (TX ID #1) of the wireless power transmitter included in the communication signal 1331. More particularly, the another wireless power transmitter 1310 may disregard the electronic device 1320 based on the fact that the identification information (TX ID #1) of the wireless power transmitter included in the communication signal 1331 is different from its own identification information. Accordingly, a cross connection in which the electronic device 1320 is connected to the another wireless power transmitter 1310 which is located at a relatively long distance, may be avoided.

Figure 14:
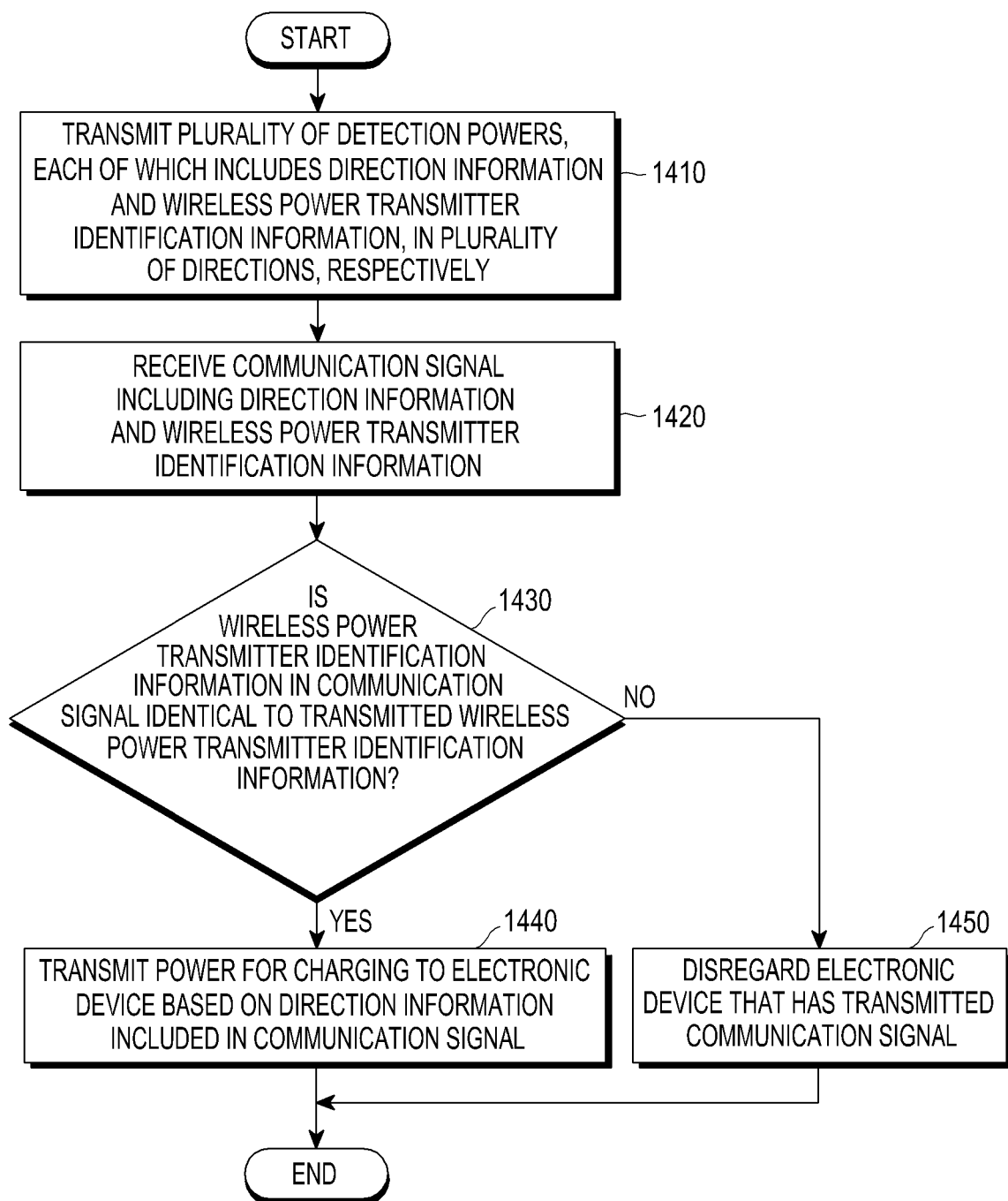
FIG. 14 is a flowchart illustrating a control method of a wireless power transmitter according to various embodiments of the present disclosure.

FIG. 14 is a flowchart illustrating a control method of a wireless power transmitter according to various embodiments of the present disclosure.

In operation 1410, a wireless power transmitter may transmit a plurality of powers, each of which includes direction information and wireless power transmitter identification information, in a plurality of directions, respectively. In operation 1420, the wireless power transmitter may receive a communication signal including direction information and wireless power transmitter identification information. The electronic device may extract direction information and wireless power transmitter identification information from received power, that is, an RF wave, and may transmit a communication signal including the extracted direction information.

In operation 1430, the wireless power transmitter may determine whether the wireless power transmitter identification information in the communication signal is the same as the transmitted wireless power transmitter identification information. When it is determined that the wireless power transmitter identification information in the communication signal is the same as the transmitted wireless power transmitter identification information, the wireless power transmitter may transmit power to the electronic device based on the direction information included in the communication signal in operation 1440. That is, the wireless power transmitter affiliate the electronic device to a network managed by the wireless power transmitter, and may transmit power. When it is determined that the wireless power transmitter identification information in the communication signal is different from the transmitted wireless power transmitter identification information, the wireless power transmitter may disregard the electronic device that has transmitted the communication signal in operation 1450. That is, the wireless power transmitter may not affiliate the electronic device to a network managed by the wireless power transmitter.

Figure 15:
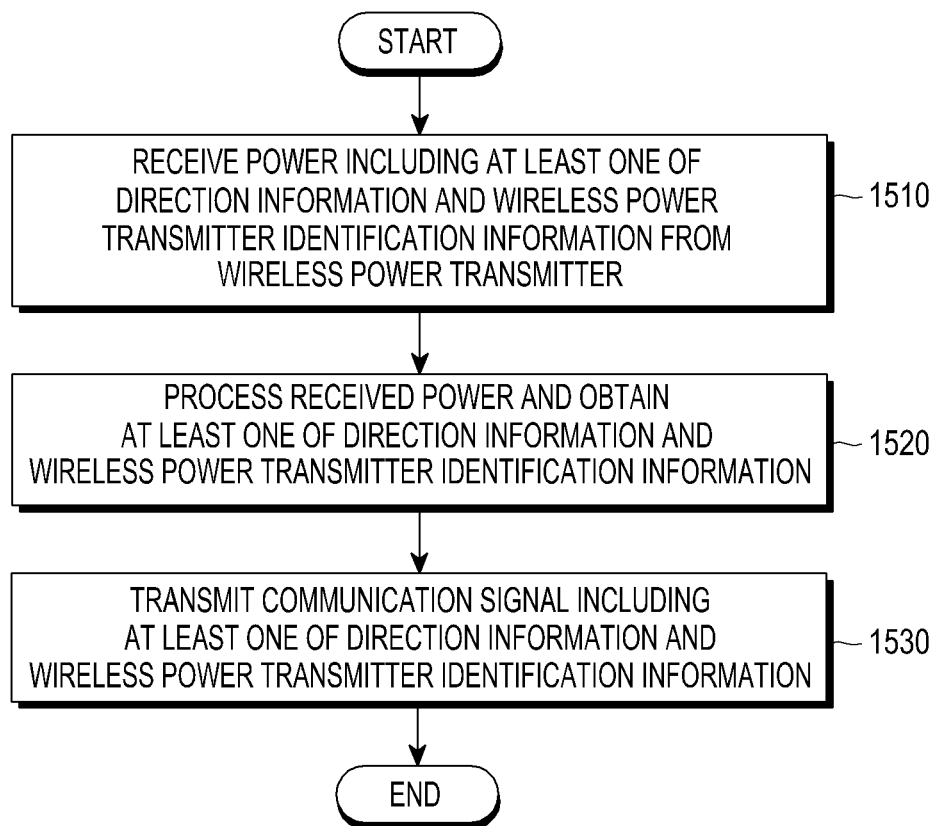
FIG. 15 is a flowchart illustrating a control method of an electronic device according to various embodiments of the present disclosure.

FIG. 15 is a flowchart illustrating a control method of an electronic device according to various embodiments of the present disclosure.

In operation 1510, an electronic device may receive power including at least one of direction information and wireless power transmitter identification information from a wireless power transmitter. The electronic device may receive power including at least one of direction information and wireless power transmitter identification information from the wireless power transmitter using a power reception antenna array. In operation 1520, the electronic device may process the received power so as to obtain at least one of the direction information and the wireless power transmitter identification information. The electronic device may process the received power using a predetermined demodulation scheme, and may obtain at least one of the direction information and the wireless power transmitter identification information based on the demodulation result.

In operation 1530, the electronic device may transmit a communication signal including at least one of the direction information and the wireless power transmitter identification information. The electronic device may transmit the communication signal including at least one of the direction information and the wireless power transmitter identification information through a communication circuit which is included separately from the power reception antenna array.

Figure 16:
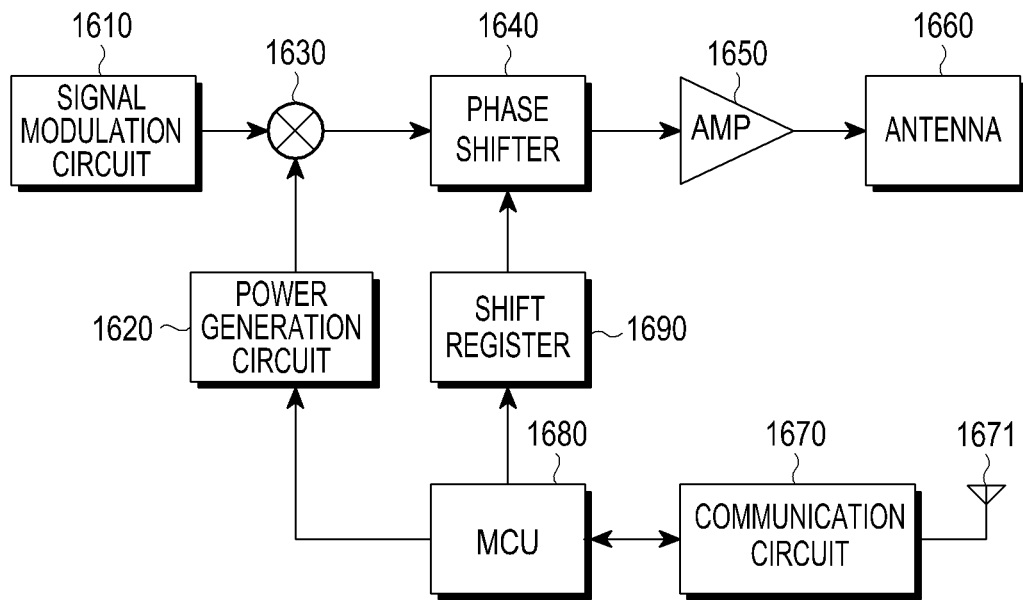
FIG. 16 is a block diagram illustrating a modulation process by a wireless power transmitter according to various embodiments of the present disclosure.

FIG. 16 is a conceptual diagram illustrating a modulation process by a wireless power transmitter according to various embodiments of the present disclosure.

A wireless power transmitter may include a signal modulation circuit 1610, a power source 1620, a mixer 1630, a phase shifter 1640, an amplifier (AMP) 1650, an antenna 1660, a communication circuit 1670, a communication antenna 1671, a MCU 1680, and a shift register 1690.

The MCU 1680 may control the phase shifter 1640 and the shift register 1690 such that an RF wave is formed in a first direction. For example, a plurality of the phase shifters 1640 and the shift registers 1690 may be used, and the MCU 1680 may output, to the shifter register 1690, digital shifting information set in advance based on a direction. The shift register 1690 may provide the received shifting information to a plurality of phase shifters 1640. Each of the plurality of phase shifters 1640 may shift the phase of a signal input from the mixer 1630, based on the received shifting information. This may be expressed as delaying an input signal by the phase shifter 1640. The phase shifting information of the phase shifters 1640 may be different from one another and, accordingly, beamforming is performed at a point out of the center of the antenna 1660. A hardware device such as HMC642, HMC1113, or the like may be used as the phase shifter 1640. The MCU 1680 may control the signal modulation circuit 1610 such that a modulation signal corresponding to direction information is output. The power source 1620 may generate a signal for power transmission. The mixer 1630 may mix a modulation signal and a signal for power transmission. Accordingly, a modulation circuit including direction information may be provided from the mixer 1630 to the phase shifter 1640. A phase shifted signal may be amplified by the amplifier 1650, and may be input into each of a plurality of patch antennas of the antenna 1660. Accordingly, an RF wave including direction information may be beamformed in a predetermined direction. A communication signal received through the communication antenna 1671 may be processed through the communication circuit 1670, and information included in the communication signal may be provided to the MCU 1680. The MCU 1680 may obtain direction information included in the communication signal, whereby the direction of the electronic device may be determined.

Figure 17:
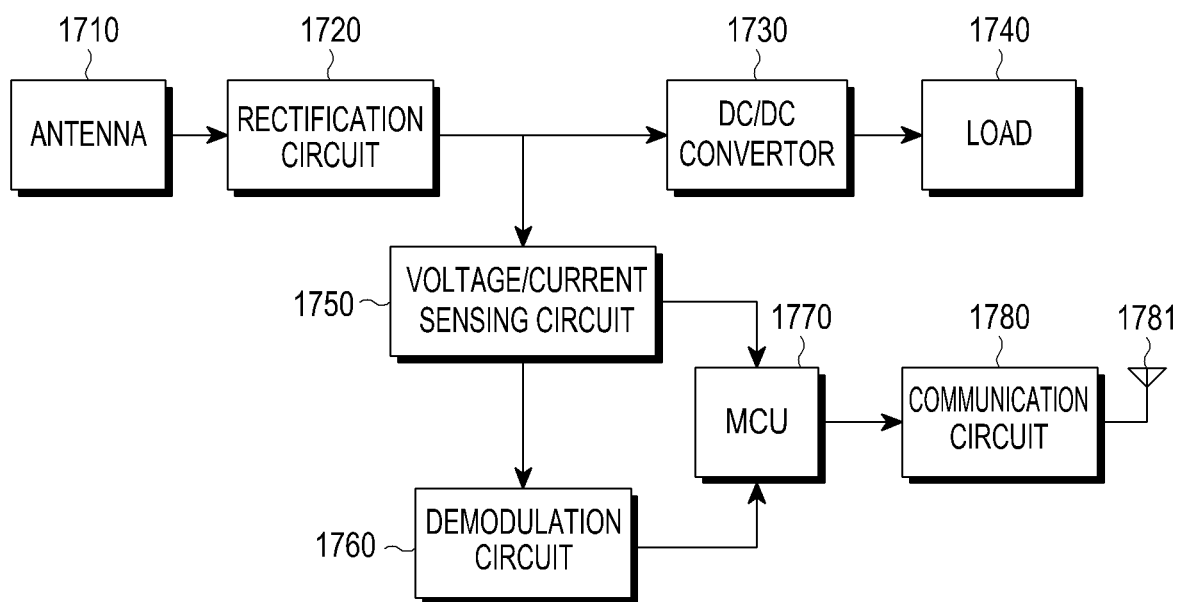
FIG. 17 is a block diagram illustrating a demodulation process by an electronic device according to various embodiments of the present disclosure.

FIG. 17 is a block diagram illustrating a demodulation process by an electronic device according to various embodiments of the present disclosure.

An electronic device may include an antenna 1710, a rectification circuit 1720, a DC/DC converter 1730, a load 1740, a voltage/current sensing circuit 1750, a demodulation circuit 1760, an MCU 1770, a communication circuit 1780, and a communication antenna 1781.

The antenna 1710 may receive power, that is, an RF wave, from a wireless power transmitter. The rectification circuit 1720 may rectify an RF wave, and output the same. The voltage and current sensing circuit 1750 may sense at least one of the voltage and the current of a rectified power. The demodulation circuit 1760 may perform demodulation using at least one of a voltage and a current. The MCU 1770 may determine direction information included in an RF wave using a demodulation result. The MCU 1770 may provide a communication signal including the direction information to the communication circuit 1780, and the communication circuit 1780 may transmit the communication signal including the direction information to the outside through the communication antenna 1781. The DC/DC converter 1730 may convert a rectified power to a predetermined voltage value, and may transfer the converted power to the load 1740.

Figure 18A:
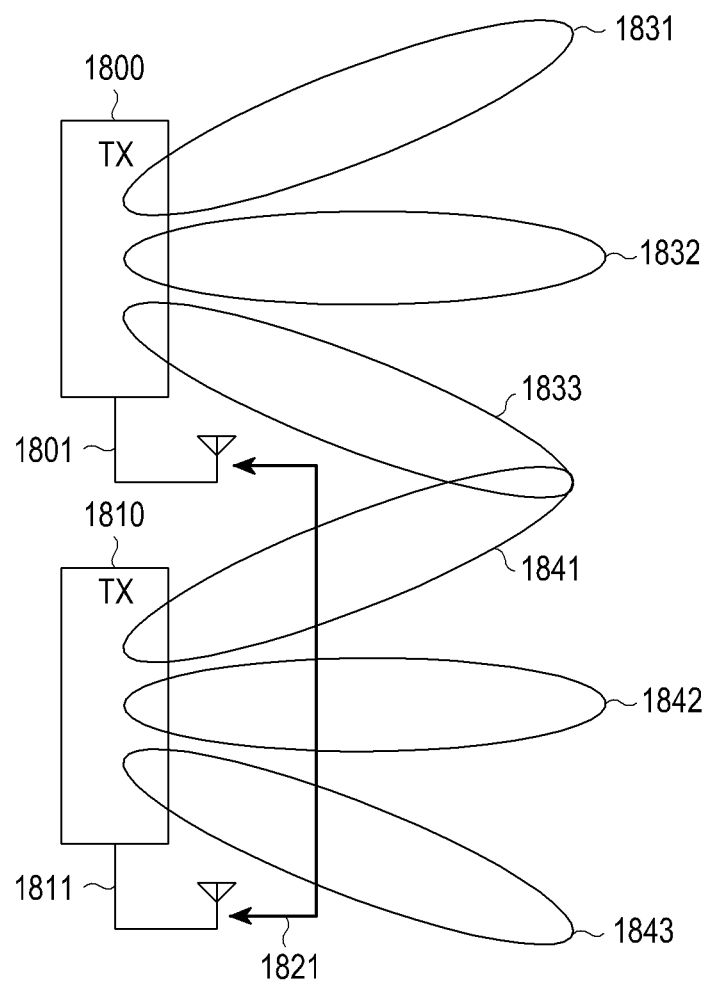
FIGS. 18A and 18B are conceptual diagrams illustrating an operation of a wireless power transmitter according to various embodiments of the present disclosure.
Figure 18B:
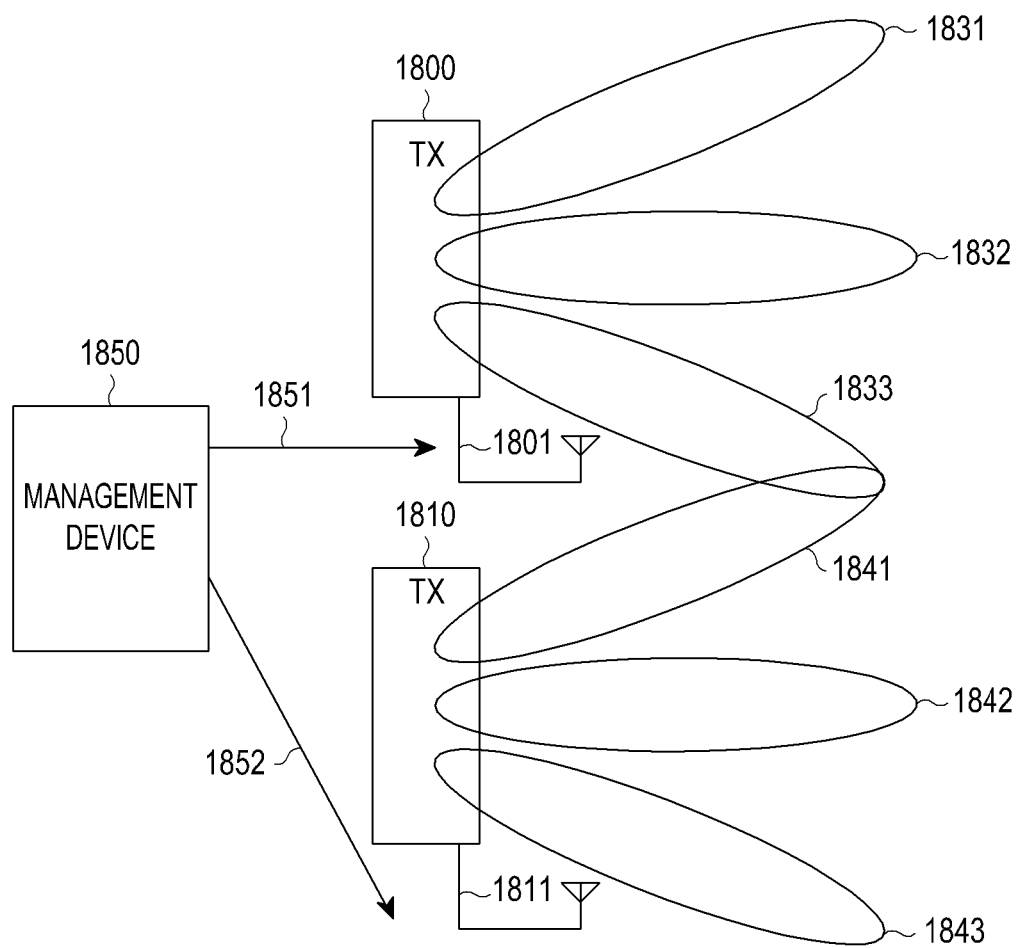

FIGS. 18A and 18B are conceptual diagrams illustrating an operation of a wireless power transmitter according to various embodiments of the present disclosure.

Referring to FIG. 18A, a plurality of wireless power transmitters, for example, a first wireless power transmitter 1800 and a second wireless power transmitter 1810 which may be disposed in one region. The first and second wireless power transmitters 1800 and 1810 may include communication circuits 1801 and 1811, respectively. The first wireless power transmitter 1800 may transmit a first power 1831, a second power 1832, and a third power 1833 in a first direction, a second direction, and a third direction, respectively. The second wireless power transmitter 1810 may transmit a fourth power 1841, a fifth power 1842, and a sixth power 1843 in a fourth direction, a fifth direction, and a sixth direction, respectively. In this instance, the areas covered by the third power 1833 and the fourth power 1841 may overlap each other. Accordingly, a period in which the first wireless power transmitter 1800 applies the third power 1833 and a period in which the second wireless power transmitter 1810 applies the fourth power 1841 may be set to not overlap each other. For example, the first wireless power transmitter 1800 may transmit, to the second power transmitter 1810, information related to an application time of first to third powers 1831 to 1833 as a communication signal 1821. The second wireless power transmitter 1810 may identify the application time of the received first to third powers 1831 to 1833 of the first wireless power transmitter 1800, and may transmit power 1841 to 1843 by evading the corresponding application time. Accordingly, the third power 1833 and the fourth power 1841 may be prevented from being applied at the same time period.

According to another embodiment, a management device 1850 capable of managing the first and second wireless power transmitters 1800 and 1810 may manage a power application time of each of the plurality of wireless power transmitters 1800 and 1810. For example, the management device 1850 may determine such that the first wireless power transmitter 1800 applies first to third powers 1831 to 1833 in a first time, and the second wireless power transmitter 1810 applies power 1841 to 1843 in a second time. The management device 1850 may provide information 1851 and 1852 associated with a power application time of a wireless power transmitter to the first and second wireless power transmitters 1800 and 1810, respectively. The management device 1850 may communicate with each of the first and second wireless power transmitters 1800 and 1810, by wire or wirelessly. Each of the wireless power transmitters 1800 and 1810 may apply power at a corresponding time based on received information 1851 and 1852. Accordingly, the third power 1833 and the fourth power 1841 may be prevented from being applied at the same time period.

A control method of a wireless power transmitter according to various embodiments of the present disclosure may include: transmitting a plurality of detection powers, each of which includes direction information, in a plurality of directions; receiving a communication signal including first direction information included in a first detection power, from an electronic device that receives the first detection power among the plurality of detection powers; and transmitting power for charging based on the first direction information included in the communication signal.

The operation of transmitting the plurality of detection powers, each of which includes direction information, in a plurality of directions, respectively, may include transmitting the plurality of detection powers sequentially or transmitting the plurality of detection powers at substantially the same time.

The operation of transmitting the power for charging based on the first direction information included in the communication signal according to various embodiments of the present disclosure may include controlling an antenna of the wireless power transmitter such that the power for charging is transmitted in a direction corresponding to the first direction information included in the communication signal, and the control method of the wireless power transmitter according to various embodiments of the present disclosure may further include receiving another communication signal including reception power related information from the electronic device.

The control method of the wireless power transmitter according to various embodiments of the present disclosure may further include: determining whether the reception power related information satisfies a predetermined condition; and adjusting a magnitude of the power for charging when the reception power related information does not satisfy the predetermined condition, or performing control such that a magnitude of the power for charging is maintained when the reception power related information satisfies the predetermined condition.

The control method of the wireless power transmitter according to various embodiments of the present disclosure may further include: generating a signal for the detection power; and modulating the signal for the detection power based on the direction information.

The operation of transmitting the plurality of detection powers, each of which includes direction information, in a plurality of directions, respectively, may include transmitting the first detection power including the first direction information in a first direction using a first part of the plurality of patch antennas of the wireless power transmitter, and transmitting a second detection power including second direction information in a second direction using a second part of the plurality of patch antennas.

The operation of transmitting the plurality of detection powers, each of which includes direction information, in a plurality of directions, respectively, may include transmitting each of the plurality of detection powers using a first part of the plurality of patch antennas of the wireless power transmitter, and the operation of transmitting the power for charging may include performing control such that the power for charging is transmitted using a second part of the plurality of patch antennas.

The operation of transmitting the plurality of detection powers, each of which includes direction information, in a plurality of directions, respectively, may include transmitting the plurality of detection powers, each of which includes direction information and identification information of the wireless power transmitter, and the operation of receiving the communication signal may include receiving the communication signal including the first direction information and identification information of the wireless power transmitter from the electronic device.

The control method of the wireless power transmitter according to various embodiments of the present disclosure may further include performing control such that the power for charging is transmitted in a first direction when the identification information of the wireless power transmitter included in the communication signal is the same as the identification information of the wireless power transmitter included in each of the plurality of detection powers, or such that the power for charging is not transmitted in the first direction when the identification information of the wireless power transmitter included in the communication signal is different from the identification information of the wireless power transmitter included in each of the plurality of detection powers.

A control method of an electronic device according to various embodiments of the present disclosure may include: receiving power including direction information; extracting the direction information from the received power; and transmitting a communication signal including the extracted direction information.

The operation of transmitting the plurality of detection powers, each of which includes direction information, in the plurality of directions, respectively, may include transmitting the plurality of detection powers, each of which includes direction information and distance information of a corresponding detection power, the operation of receiving the communication signal may include receiving the communication signal including the first direction information and first distance information included in the first detection power from the electronic device, and the operation of transmitting the power for charging may include transmitting the power for charging based on the first direction information and the first distance information included in the communication signal.

According to various embodiments of the present disclosure, a storage medium stores instructions, wherein the instructions are set to enable at least one processor to perform at least one operation when the instructions are executed by the at least one processor, and the at least one operation includes: transmitting a plurality of detection powers, each of which includes direction information, in a plurality of directions; receiving a communication signal including first direction information included in a first detection power, from an electronic device that receives the first detection power among the plurality of detection powers; and transmitting power for charging based on the first direction information included in the communication signal.

According to various embodiments of the present disclosure, a storage medium stores instructions, wherein the instructions are set to enable at least one processor to perform at least one operation when the instructions are executed by the at least one processor, and the at least one operation includes: receiving power including direction information; extracting the direction information from the received power; and transmitting a communication signal including the extracted direction information.

The instructions as described above may be stored in an external server, or may be downloaded by and installed in an electronic device, such as a wireless power transmitter. That is, the external server according to various embodiments of the present disclosure may store instructions that a wireless power transmitter can download.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

What is claimed is:

1. A wireless power transmitter comprising:
   an antenna;
   a communication circuit; and
   a processor,
   wherein the processor is configured to:
      control the antenna to respectively transmit a plurality of detection powers in a plurality of directions, the plurality of detection powers comprising a first detection power and a second detection power, the first detection power including a first direction information and identification information of the wireless power transmitter, the first detection power being transmitted in a first direction, the second detection power including a second direction information and the identification information of the wireless power transmitter, the second detection power being transmitted in a second direction different from the first direction,
      control the communication circuit to receive a communication signal including the first direction information and the identification information of the wireless power transmitter from an electronic device which received the first detection power, and
      based on receiving the communication signal, control the antenna to transmit power for charging in the first direction,
   wherein the communication signal further includes identification information of the electronic device.

2. The wireless power transmitter of claim 1, wherein the processor is further configured to:
   control the communication circuit to receive another communication signal including the second direction information and the identification information of the wireless power transmitter from another electronic device which received the second detection power, and
   based on receiving the another communication signal, control the antenna to transmit power for charging in the second direction.

3. The wireless power transmitter of claim 1, wherein the antenna sequentially transmits the plurality of detection powers, or transmits the plurality of detection powers at substantially a same time.

4. The wireless power transmitter of claim 1, wherein the communication circuit receives another communication signal including reception power related information from the electronic device.

5. The wireless power transmitter of claim 4, wherein the processor is further configured to:
   determine whether the reception power related information satisfies a predetermined condition,
   adjust a magnitude of the power for charging when the reception power related information does not satisfy the predetermined condition, and
   control such that the magnitude of the power for charging is maintained when the reception power related information satisfies the predetermined condition.

6. The wireless power transmitter of claim 1, wherein the antenna comprises a plurality of patch antennas, and
   the processor is configured to perform control such that the first detection power including the first direction information is transmitted in the first direction using a first part of the plurality of patch antennas, and the second detection power including the second direction information is transmitted in the second direction using a second part of the plurality of patch antennas.

7. The wireless power transmitter of claim 1, wherein each of the first detection power and the second detection power further comprises distance information,
   the processor is further configured to:
   control the communication circuit to receive the communication signal including the first direction information, the identification information, and the distance information from the electronic device, and
   based on receiving the communication signal, control the antenna to transmit power for charging based on the first direction information and the distance information.

8. A control method of a wireless power transmitter, the control method comprising:
- controlling, by a processor of the wireless power transmitter, an antenna of the wireless power transmitter, to transmit a plurality of detection powers in a plurality of directions, respectively, the plurality of detection powers comprising a first detection power and a second detection power, the first detection power including a first direction information and identification information of the wireless power transmitter, the first detection power being transmitted in a first direction, the second detection power including a second direction information and the identification information of the wireless power transmitter, the second detection power being transmitted in a second direction different from the first direction;
- controlling, by the processor, a communication circuit of the wireless power transmitter, to receive a communication signal including the first direction information and the identification information of the wireless power transmitter from an electronic device which received the first detection power; and
- based on receiving the communication signal, controlling, by the processor, to transmit power for charging in the first direction,
- wherein the communication signal further includes identification information of the electronic device.

9. The control method of claim 8, further comprising:
- controlling the communication circuit to receive another communication signal including the second direction information and the identification information of the wireless power transmitter from another electronic device which received the second detection power; and
- based on receiving the another communication signal, control the antenna to transmit power for charging in the second direction.

10. The control method of claim 8, wherein the antenna sequentially transmits the plurality of detection powers, or transmits the plurality of detection powers at substantially a same time.

11. The control method of claim 8, wherein
the communication circuit receives another communication signal including reception power related information from the electronic device.

12. The control method of claim 11, further comprising:
- determining whether the reception power related information satisfies a predetermined condition;
- adjusting a magnitude of the power for charging when the reception power related information does not satisfy the predetermined condition; and
- controlling such that the magnitude of the power for charging is maintained when the reception power related information satisfies the predetermined condition.

13. The control method of claim 8, wherein the antenna comprises a plurality of patch antennas,
- wherein controlling the antenna to respectively transmit the plurality of detection powers in the plurality of directions comprises:
  - controlling such that the first detection power including the first direction information is transmitted in the first direction using a first part of the plurality of patch antennas, and the second detection power including the second direction information is transmitted in the second direction using a second part of the plurality of patch antennas.

14. The control method of claim 8, wherein each of the first detection power and the second detection power further comprises distance information,
further comprising:
- controlling the communication circuit to receive the communication signal including the first direction information, the identification information, and the distance information from the electronic device; and
- based on receiving the communication signal, controlling the antenna to transmit power for charging based on the first direction information and the distance information.

15. An electronic device comprising:
an antenna;
a communication circuit; and
a processor,
wherein the processor is configured to:
- control the antenna to receive, from a first wireless power transmitter, a first detection power including first direction information and first identification information of the first wireless power transmitter,
- control the antenna to receive, from a second wireless power transmitter, a second detection power including second direction information and second identification information of the second wireless power transmitter,
- select, based on the first detection power and the second detection power, a wireless power transmitter between the first wireless power transmitter and the second wireless power transmitter,
- control the communication circuit to transmit, to the selected wireless power transmitter, direction information and identification information included in a detection power received from the selected wireless power transmitter, and
- control the antenna to receive, from the selected wireless power transmitter, power for charging.

16. The electronic device of claim 15, wherein the processor is configured to select, based on a first strength of the first detection power and a second strength of the second detection power, the wireless power transmitter.

17. The electronic device of claim 15, wherein the processor is configured to select, based on a first distance between the electronic device and the first wireless power transmitter and a second distance between the electronic device and the second wireless power transmitter, the wireless power transmitter.

18. The electronic device of claim 15, wherein the antenna sequentially receives the first detection power and the second detection power, or receives the first detection power and the second detection power at substantially a same time.

* * * * *